(12) United States Patent
Brecque

(10) Patent No.: US 11,379,735 B2
(45) Date of Patent: *Jul. 5, 2022

(54) SYSTEM AND METHOD FOR AUTOMATED DOCUMENT GENERATION

(71) Applicant: Legislate Technologies Limited, Oxford (GB)

(72) Inventor: Charles Brecque, Oxford (GB)

(73) Assignee: LEGISLATE TECHNOLOGIES LIMITED, Oxford (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/368,020

(22) Filed: Jul. 6, 2021

(65) Prior Publication Data

US 2021/0383247 A1  Dec. 9, 2021

Related U.S. Application Data

(63) Continuation of application No. 17/212,520, filed on Mar. 25, 2021, now Pat. No. 11,087,219.

(Continued)

(51) Int. Cl.
*G06N 5/02* (2006.01)
*G06F 16/93* (2019.01)
(Continued)

(52) U.S. Cl.
CPC ............ *G06N 5/02* (2013.01); *G06F 16/9024* (2019.01); *G06F 16/93* (2019.01); *G06F 40/123* (2020.01);
(Continued)

(58) Field of Classification Search
CPC .... G06F 40/151; G06F 40/154; G06F 40/194; G06F 40/205; G06F 40/279; G06F 40/30;
(Continued)

(56) References Cited

U.S. PATENT DOCUMENTS 6,067,531 A  5/2000 Hoyt
6,076,088 A * 6/2000 Paik .................. G06F 16/367
707/999.005

(Continued)

FOREIGN PATENT DOCUMENTS

WO  WO-2020182413 A1 *  9/2020
WO     2020242587 A1    12/2020

OTHER PUBLICATIONS

International Search Report issued in Intl. Appln. No. PCT/IB2021/055039 dated Jul. 21, 2021.

(Continued)

*Primary Examiner* — Chau T Nguyen
(74) *Attorney, Agent, or Firm* — Rossi, Kimms & McDowell LLP

(57) ABSTRACT

A semantic document generation system is described. The semantic document is composed of document details, people and meta-data. The semantic document is self-aware of the information it contains. The semantic document's structure and terms are governed by legal, logical and party related rules. A semantic contract can be created from a semantic document generation system. The semantic document generation system receives an indication of a type of a document to be generated and plurality of terms for the document from a plurality of sources. The terms are converted into triples. A plurality of rules governing the terms of the document is applied to the triples to generate a knowledge graph and determine whether terms from the different parties are compatible. The terms are determined to be compatible in a case where the plurality of rules governing terms of the document is satisfied. If at least one set of terms is non-compatible, the system reconciles the non-compatible terms in the generated knowledge graph until all the terms are (Continued)

compatible, and generates the document based at least on the reconciled knowledge graph.

13 Claims, 21 Drawing Sheets

Related U.S. Application Data

(60) Provisional application No. 63/119,095, filed on Nov. 30, 2020, provisional application No. 63/036,729, filed on Jun. 9, 2020.

(51) Int. Cl.

| | | |
|---|---|---|
| *G06F 40/30* | (2020.01) | |
| *G06F 40/143* | (2020.01) | |
| *G06F 40/186* | (2020.01) | |
| *G06F 40/226* | (2020.01) | |
| *G06F 40/284* | (2020.01) | |
| *G06F 40/194* | (2020.01) | |
| *G06F 40/154* | (2020.01) | |
| *G06F 40/20* | (2020.01) | |
| *G06F 40/279* | (2020.01) | |
| *G06F 40/16* | (2020.01) | |
| *G06F 40/123* | (2020.01) | |
| *G06F 40/205* | (2020.01) | |
| *G06F 40/151* | (2020.01) | |
| *G06F 40/166* | (2020.01) | |
| *G06F 40/289* | (2020.01) | |
| *G06F 40/295* | (2020.01) | |
| *G06F 16/901* | (2019.01) | |
| *G06Q 10/06* | (2012.01) | |
| *G06Q 10/00* | (2012.01) | |
| *G06Q 50/18* | (2012.01) | |
| *G06Q 10/10* | (2012.01) | |
| *G06F 16/36* | (2019.01) | |
| *G06F 16/34* | (2019.01) | |
| *G06F 40/56* | (2020.01) | |

(52) U.S. Cl.
CPC .......... *G06F 40/143* (2020.01); *G06F 40/151* (2020.01); *G06F 40/154* (2020.01); *G06F 40/16* (2020.01); *G06F 40/166* (2020.01); *G06F 40/186* (2020.01); *G06F 40/194* (2020.01); *G06F 40/20* (2020.01); *G06F 40/205* (2020.01); *G06F 40/226* (2020.01); *G06F 40/279* (2020.01); *G06F 40/284* (2020.01); *G06F 40/289* (2020.01); *G06F 40/295* (2020.01); *G06F 40/30* (2020.01); *G06F 16/345* (2019.01); *G06F 16/367* (2019.01); *G06F 40/56* (2020.01); *G06Q 10/00* (2013.01); *G06Q 10/06* (2013.01); *G06Q 10/10* (2013.01); *G06Q 50/18* (2013.01); *G06Q 50/188* (2013.01)

(58) Field of Classification Search
CPC ...... G06F 40/143; G06F 40/186; G06F 16/93; G06F 40/123; G06F 40/16; G06F 40/166; G06F 40/20; G06F 40/226; G06F 40/284; G06F 40/289; G06F 40/295; G06N 5/02; G06Q 10/06

See application file for complete search history.

(56) References Cited

U.S. PATENT DOCUMENTS

| | | |
|---|---|---|
| 10,482,554 B1 | 11/2019 | Vukich |
| 2003/0046261 A1 | 3/2003 | Baker |
| 2014/0052575 A1 | 2/2014 | Yu |
| 2016/0171635 A1 | 6/2016 | Senzee |
| 2016/0269453 A1 | 9/2016 | Redniss |
| 2017/0330285 A1 | 11/2017 | Ehrhart |
| 2017/0351762 A1 | 12/2017 | Lecue |
| 2018/0253409 A1 | 9/2018 | Carlson |
| 2018/0268506 A1 | 9/2018 | Wodetzki |
| 2019/0179878 A1* | 6/2019 | Collins ............... G06N 5/02 |
| 2019/0266196 A1 | 8/2019 | Boyce |
| 2020/0065922 A1 | 2/2020 | Goldstraj |
| 2020/0380624 A1 | 12/2020 | Turgman |
| 2021/0357595 A1* | 11/2021 | Perez ............... G06F 40/40 |

OTHER PUBLICATIONS

Written Opinion issued in Intl. Appln. No. PCT/IB2021/055039 dated Jul. 21, 2021.
Yan et al., "Knowledge-empowered agent negotiation for electronic commerce with knowledge beads", published on Jan. 1, 2005, but last updated Jan. 12, 2009, IEEE Conference Paper from IP.com, pp. 2 (Year: 2009).
Notice of Allowance issued in U.S. Appl. No. 17/212,520 dated Jun. 24, 2021.

* cited by examiner

SYSTEM AND METHOD FOR AUTOMATED DOCUMENT GENERATION

TECHNICAL FIELD OF THE INVENTION

Aspects of this disclosure generally are related to systems and methods of automating document generation in computing devices. More particularly, but not exclusively, the present invention relates to the modelling of document terms from multiple parties as knowledge graphs, using symbolic reasoning to reconcile and materialise the knowledge graph and generating the document based on compatible terms in the knowledge graph.

BACKGROUND OF THE INVENTION

Document generation has historically been performed by humans writing into a text editor. The first automation advances focused on the repetitive tasks of the document generation process, such as page numbering, formatting and figure labelling using macros. For more frequently created documents, such as emails or letters, automation advances were enabled by the development of algorithmic scripts that can complete a pre-written document template with the correct terms collected from a user or a database. The most recent advances in document generation have come from training machine learning models to generate text for a specific theme or subject, such as novels, summaries or poetry.

Machine understandable information does not require users in the loop to interpret, act, and share information with other systems. Word processing documents and portable document format files are not natively machine understandable because of the unstructured nature of their content, which means that information cannot be systematically inserted or scraped from the documents by an automated system unless the structure is known in advance. As a result, workflows and processes involving such documents have not benefited as much from automation because of their dependency on users in the loop to perform the processes. Even though a contract document stores information, it is non-machine understandable because the contract itself does not know what information it contains or what it means, which would otherwise enable it to be active in the document process. The information in a contract, therefore, needs to be extracted by a user or a specialised system, which makes the exchange of that information with other systems and the management of contracts challenging.

As a result, attempts to improve document-centric workflows and processes have focused on optimising the workflow around the user in the loop or developing tools to make the users in the loop more efficient. However, in both cases, the process is still dependent on a user in the loop. The performance of the document-centric workflow, therefore, hinges on the performance of the user in the loop, which, in some cases, can erase the workflow optimisation gains. Moreover, when the user has been successfully taken out of the loop, this has been because the structure and content of the documents are not expected to be read, understood, or changed during the process, which, therefore, relies on the quality of the work of the user who created the first document. For example, for frequently created documents such as emails or letters, automation advances were enabled by the development of algorithmic scripts which can complete a pre-written document template with the correct terms collected from a user or a database.

The most recent advances in document generation have come from training machine learning models to generate text for a specific theme or subject, such as novels, summaries or poetry. However, because documents and contracts are not machine understandable, they are not aware if they are valid or if their clauses are good or bad. In the context of legal contracts, typically, a lawyer will be required to control the language and compliance with the relevant legal and logic rules, which means that machine learning generated clauses will still need a lawyer in the loop to validate them. This presents a significant hurdle for robust and safe contract negotiation automation.

Moreover, all of these methods to automatically generate documents are one-directional and, therefore, difficult to reverse, as might be the case during a conversation or a contract negotiation. The impact of automatically generated documents has, therefore, been limited to areas where reversibility is not expected or is inexpensive, such as standard terms and conditions or receipts. As a result, documents which are likely to be modified have only been, at the most, semi-automated and have required human input to reach their final state. The invention in this application advances automated document generation by providing the flexibility and coverage to documents which are likely to be reversed or modified during their creation before they reach their final state.

One example of an automatically generated document that would typically require additional negotiation from parties before reaching a final state is a contract. Every relationship is founded on a contract. Social contracts tend to be implicit and built on trust or a shared understanding, whereas business contracts are usually explicit to supplement any lack of these. Contracts provide a framework for these relationships to exist under conditions which are directly or implicitly negotiated by the parties.

Contract negotiation may be influenced by many factors and can be the most challenging stage of the establishment of the relationship because each party will try to protect their own interests. Formal contract negotiation typically involves legal teams whose size and experience can heavily sway the outcome, which can be devastating for weaker or less experienced parties. Poorly negotiated terms can lead to intellectual property theft, lost revenues, litigation, bankruptcy or worse.

Contract negotiation also tends to happen at draft level in a text editor. Each party may take turns to email each other manually suggested edits in a marked-up version of the draft, which is a breeding ground for typos and errors. The unreliability of change tracking means each party will typically re-read the entire document after each suggestion to verify that no additional edits or terms have creeped in. This whole process is time consuming and can last weeks or months depending on the availability of each party's legal team.

Moreover, once a contract is negotiated and agreed, the final format is often a signed hardcopy that is not machine readable and, therefore, difficult to search or automatically keep track of for renewals, opt-outs and termination events. Following a merger or acquisition, a manual review of every single contract is usually required to determine which contracts require permission from the other party to be assigned because this information is not consistently stored between contracts or is easily accessible from a centralised system. Contacting the associated parties when assignment permission is required is not automated either.

The current approach to drafting and preparing contracts is also not well suited to changes in the law; and when these occur, new templates are often generated from scratch. A manual review of executed agreements which haven't yet expired is then required to determine if any changes are required to the wording or scope. This can happen more often with employment contracts, for example where the laws and employee rights evolve more frequently.

Some approaches to improving the velocity of the negotiation process are to increase the legal budget or to simply skip negotiation, which in most cases are not acceptable or scalable and can be quite reckless. Moreover, increasing one's legal budget is only half of the solution because at least two separate parties are involved, and it will, therefore, have a limited effect if the other party does not do the same or is slow and inexperienced.

Another approach to accelerate and rebalance contract negotiations is to leverage technology. Document templates are widely available online. Machine Learning algorithms and cloud hosted editors have attempted to reduce the time and effort for the legal analysis of documents. Cloud document storage platforms and blockchain based networks have attempted to improve contract management, traceability and visibility post signature. However, because of the challenge of legal concepts and legalese, these solutions are only improving the velocity and management at the edges of the problem but not of the configuration and negotiation of documents itself One such example of a document process improvement, which has improved contract negotiation, is the introduction of electronic signatures. The process of printing documents and signing them with wet ink is no longer a necessity thanks to electronic signature providers like DocuSign® and HelloSign®. However, a user is still required to draft, negotiate and sign the terms of a contract. Because the contract itself is not machine readable or understandable, the information in the contract then needs to be extracted appropriately by a user or a specialised system.

Many template providers exist, such as SeedLegals® or Legalzoom®, but they still require lawyers to adapt or change the terms if the parties require amendments to the documents, which does not solve the velocity or management challenge involved in contract negotiation and creation.

One example of an optimisation of the users in the loop is automated mark-up tools such as Legal Sifter®. Because documents are non-machine understandable, Machine Learning algorithms are trained to identify terms which have been previously flagged by users as unacceptable or requiring specialised attention. Such tools enable the user in the negotiation loop to quickly identify issues from the start. However, Machine Learning algorithms are never 100% accurate because of their statistical nature, which means that the user in the loop still needs to read the entire document. Moreover, the marking up process does not extract the information and the user, or a separate specialised system, will be required to extract the contract information for contract management and reusability purposes.

One example of a specialised information extraction tool for contracts is Eigen®, which uses machine learning techniques to extract contract elements such as transaction amounts and dates. The software is trained on a sample of a client's contracts to identify those elements broadly across the remainder of their contracts. This technology is not accessible to smaller organisations and it is not perceived as a silver bullet because the machine learning based extraction process is not 100% accurate.

Web-based word-processing programs such as Google Docs® enable real-time collaboration on contracts, but this process still requires legal teams to spend time reading and marking up the document. Although collaborative document editing is helping reduce the communication loop, such techniques still depend on the parties having lawyers to support the negotiation. Moreover, both parties need to be committed to the negotiation in order to efficiently advance the drafting of the contract.

Juro®, a more specialised Google Docs® for contract creation and management, is helping reduce the communication loop by improving the connectivity between the various actors and is mobile friendly, but still requires legal teams in order to advance the negotiation process, which does not solve the velocity challenge of negotiation. Juro® supports automated integrations with CRMs and reminders for renewals and opt-outs, but does not provide automated alerts when contracts are affected by an assignment or law change.

Cloud hosted contract storage platforms can provide some visibility into where the contracts are stored and when their lifecycle events are programmed, subject to the platforms supporting this functionality. Online storage platforms such as Dropbox® or Google Drive® may be used to store contracts; these platforms have some search capability that can help find contracts as long as the person performing the search knows what to look for, but they do not automate the reminders. Moreover, all these solutions presuppose that the contract negotiation process has already occurred, which is dependent on the parties having lawyers to support the negotiation. Clause.io® helps improve the visibility, traceability and integration of contracts with enterprise systems for alerting and task management purposes post signature but does not address the negotiation of contracts or the social aspects of contract networks.

Blockchain based contract management solutions such as Icertis® attempt to certify the relationships between the parties by offering a platform that guarantees the proof of existence of contracts between members of the network and provides visibility into these relationships across the network. However, the existence of a contract is dependent on the parties having lawyers to support the negotiation and this approach, therefore, also does not improve the velocity of the process. Moreover, in Icertis®, visibility and traceability of contracts does not extend to the contracts' actual content, which would be necessary to improve contract management.

Because lawyers are essential to all of the above, social networks, rating websites and marketplaces have had to limit the scope of their services and products to those which members accept without negotiating the terms (Amazon®) or act simply as a virtual marketplace to connect users, such as Facebook Marketplace® or Rightmove®. The actual process of contract creation, negotiation and management is then supported by the parties themselves outside of the platforms.

Finally, because lawyers and their legal expertise are essential for the contract negotiation piece, none of the stated technologies have managed to address the automation of the configuration or negotiation piece due to the complexity of the framework and documents. Instead, the existing solutions have focused on only improving the velocity or management at the edges of the problem.

All these solutions have been developed on the premise that documents are too complicated to become machine understandable or that users are necessary for the accurate processing of these documents. However, the fact that documents are not machine understandable and that legal expertise is not automated is due to the absence of a common document modal, in particular for contracts.

Accordingly, there is a desire to reduce the time and cost of contract configuration and negotiation with technology in a way that benefits all parties equally and without jeopardizing the quality or completeness of the contracts. Further, there is a desire to make documents and contracts machine understandable so that document centric processes can be automated without requiring a user in the loop for the processing of the document. There is also a desire to improve the contract's self-awareness and ability to share its information seamlessly with external parties and system. There is also a desire to improve the contract's connectivity with external laws and contracts so that it automatically knows when it is affected and how it might need to evolve. There is also a desire to improve the ability to search the contract terms by leveraging the contract system's self-awareness and understanding, and improve contract management and visibility post-signature. There is also a desire to improve the contract's ability to control its structure based on logical and legal rules to reduce the dependence on lawyers in the loop. There is also a desire to improve the determination of aggregate statistics across a plurality of contracts. Finally, there is a desire to expand the types of services and products offered through social networks, commercial networks and marketplaces, and to empower members of social networks to negotiate the terms of the products and services they are purchasing.

SUMMARY OF THE INVENTION

At least the above-discussed need is addressed and technical solutions are achieved in the art by various embodiments of the present invention. Modelling documents as knowledge graphs make machine understandable semantic documents a reality and enables the native retrieval and exchange of document information with integrated systems and parties, the verification by the documents themselves that their structure and content comply with legal and logical rules, and the determination of aggregate statistics across a plurality of documents of different types.

According to a first embodiment of the invention there is provided a document generation system comprising at least one memory configured to a store a program and at least one processor communicatively connected to the at least one memory and configured to execute the stored program.

In some embodiments, the semantic document generation system may be configured to, via the stored program, receive an indication of a type of a document to be generated, the type of the document defining a plurality of rules governing terms of the document. In some embodiments, the document generation system may be further configured to receive a plurality of terms from a plurality of sources including at least a first set of terms of the document from a first source and a second set of terms of the document from a second source, wherein the first source is different from the second source. In some embodiments, the document generation system may be further configured to convert the first set of terms into a first plurality of triples, convert the second set of terms into a second plurality of triples, and apply the plurality of rules governing the terms of the document to the first plurality of triples and the second plurality of triples to generate the knowledge graph and determine whether the first set of terms is compatible with the second set of terms, In some embodiments, the first set of terms is determined to be compatible with the second set of terms in a case where the plurality of rules governing terms of the document is satisfied. In some embodiments, the document generation system may be further configured to, in a case where at least one or more first terms of the first set of terms is non-compatible with one or more second terms of the second set of terms, reconcile at least one of the one or more first terms or the one or more second terms that are non-compatible in the generated knowledge graph until the first set of terms is compatible with the second set of terms. In some embodiments, the document generation system may be further configured to generate the document based at least on the reconciled knowledge graph.

In some embodiments, the plurality of rules governing the terms of the document are automatically extracted from a knowledge graph template associated with the type of the document to be generated.

In some embodiments, in the case where at least one or more first terms of the first set of terms is non-compatible with the one or more second terms of the second set of terms, the at least one processor is further configured to execute the stored program to receive historical data pertaining to compatible values for the at least one or more first terms non-compatible with the one or more second terms, and propose a change to at least one of the non-compatible one or more first terms or one or more second terms based on the received historical data. In some embodiments, the document generation system may be further configured to, in a case where the proposed change is to the one or more first terms, transmit the proposed change to the one or more first terms to the first source and receive updated values for the one or more first terms from the first source. In some embodiments, the document generation system may be further configured to, in a case where the proposed change is to the one or more second terms, transmit the proposed change to the one or more second terms to the second source and receive updated values for the one or more second terms from the second source.

In some embodiments, the system may include at least one data store configured to store a plurality of types of documents and an associated plurality of terms for each type of document of the plurality of types of documents. In some embodiments, the system may be further configured to, via the stored program, receive, as the plurality of terms, the associated plurality of terms for the indicated type of the document from the at least one data store.

In some embodiments, the at least one data store is further configured to store an associated plurality of rules for each type of document of the plurality of types of documents. In some embodiments, the system may be further configured to, via the stored program, validate the received plurality of terms by applying the associated plurality of rules for the indicated type of the document.

In some embodiments, the at least one processor is further configured to execute the stored program to receive historical data pertaining to standardized values for compatible first terms and second terms, compare the values of the compatible first terms and second terms with the standardized values in the historical data, and provide an alert in a case where the values of the compatible first terms and second terms deviate from the standardized values in the historical data.

In some embodiments, the historical data includes one or more of a collection of past documents, legal rules representing domain knowledge, or information associated with a jurisdiction of the first source or the second source.

In some embodiments, the terms of the document include negotiable terms and non-negotiable terms, and the knowledge graph is generated using one or more first triples of the first plurality of triples corresponding to the negotiable terms and one or more second triples of the second plurality of triples corresponding to the negotiable terms.

In some embodiments, the knowledge graph includes a first sub-graph representing the first set of terms from the first source and a second sub-graph representing the second set of terms from the second source, and the at least one processor is further configured to execute the stored program to apply the plurality of rules governing the terms of the document to the first sub-graph and the second sub-graph, identify corresponding terms of the first sub-graph and the second sub-graph where equivalent values are provided as compatible, and identify corresponding terms of the first sub-graph and the second sub-graph where non-equivalent values are provided as non-compatible.

In some embodiments, the plurality of rules includes one or more first rules that determine whether the first set of terms is compatible with the second set of terms and one or more second rules that reconcile at least one of the one or more first terms or the one or more second terms that are non-compatible, and the at least one processor is further configured to execute the stored program to apply the one or more first rules to the generated knowledge graph before applying the one or more second rules to the generated knowledge graph.

In some embodiments, the plurality of sources includes one or more of a user, a commercial entity, or a program configured to provide the terms of the document to the document generation system.

In some embodiments, a method of generating a document is executed by a programmed processor. In some embodiments, the method includes: receiving an indication of a type of a document to be generated, the type of the document defining a plurality of rules governing terms of the document; receiving a plurality of terms from a plurality of sources including at least a first set of terms of the document from a first source and a second set of terms of the document from a second source, wherein the first source is different from the second source; converting the first set of terms into a first plurality of triples; converting the second set of terms into a second plurality of triples; applying the plurality of rules governing the terms of the document to the first plurality of triples and the second plurality of triples to generate the knowledge graph and determining whether the first set of terms is compatible with the second set of terms, wherein the first set of terms is determined to be compatible with the second set of terms in a case where the plurality of rules governing terms of the document is satisfied; in a case where at least one or more first terms of the first set of terms is non-compatible with one or more second terms of the second set of terms, reconciling at least one of the one or more first terms or the one or more second terms in the generated knowledge graph that are non-compatible until the first set of terms is compatible with the second set of terms; and generating the document based at least on the reconciled knowledge graph.

In some embodiments, the method of generating a document, executed by a programmed processor, is stored on a non-transitory computer readable storage medium.

According to some embodiments, a computer program product includes program code portions for performing the steps of any or all of each of methods described herein, when the computer program product is executed by a computing device. Each of any or all of such computer program products may be stored on one or more computer readable storage mediums.

Various embodiments of the present invention may include systems, devices, or machines that are or include combinations or subsets of any or all of the systems, devices, or machines and associated features thereof described herein.

Further, all or part of any or all of the systems, devices, or machines discussed herein or combinations or subcombinations thereof may implement or execute all or part of any or all of the methods and processes discussed herein or combinations or subcombinations thereof.

Any of the features of all or part of any or all of the methods and processes discussed herein may be combined with any of the other features of all or part of any or all of the methods and processes discussed herein. In addition, a computer program product may be provided that comprises program code portions for performing some or all of any or all of the methods and processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of one or more of the methods and processes described herein.

Further, any or all of the methods and associated features thereof discussed herein may be implemented or executed by all or part of a device system, apparatus, or machine, such as all or a part of any of the systems, apparatuses, or machines described herein or a combination or subcombination thereof.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

DETAILED DESCRIPTION OF THE INVENTION

Figure 1:
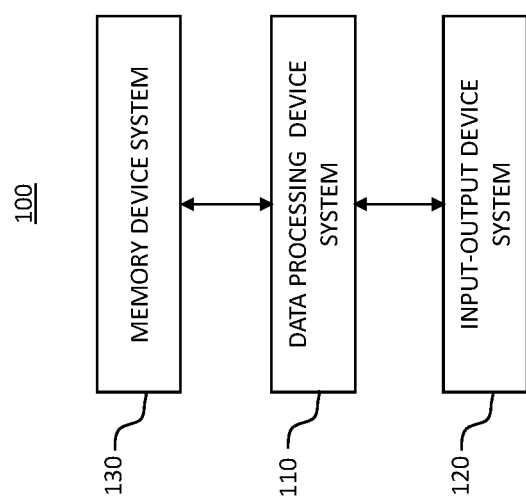
FIG. 1 shows an example of a computing device system in accordance with an embodiment of the invention.

The present invention provides various systems and methods for modelling contract terms as machine understandable and self-aware semantic graphs and automating document generation, negotiation and management with symbolic reasoning. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", "some embodiments" and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", "some embodiments" or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware. Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The term "program" in this disclosure should be interpreted to include one or more programs including a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 251, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Further still, example methods are described herein with respect to FIGS. 6, 7, 12, and 17. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIGS. 6, 7, 12, and 17 herein is not limited to an actual structure of any program or set of instructions or required ordering of method tasks, and such method FIGS. 6, 7, 12, and 17, according to some embodiments, merely illustrate the tasks that instructions are configured to perform, for example upon execution by a data processing device system in conjunction with interactions with one or more other devices or device systems.

Figure 2:
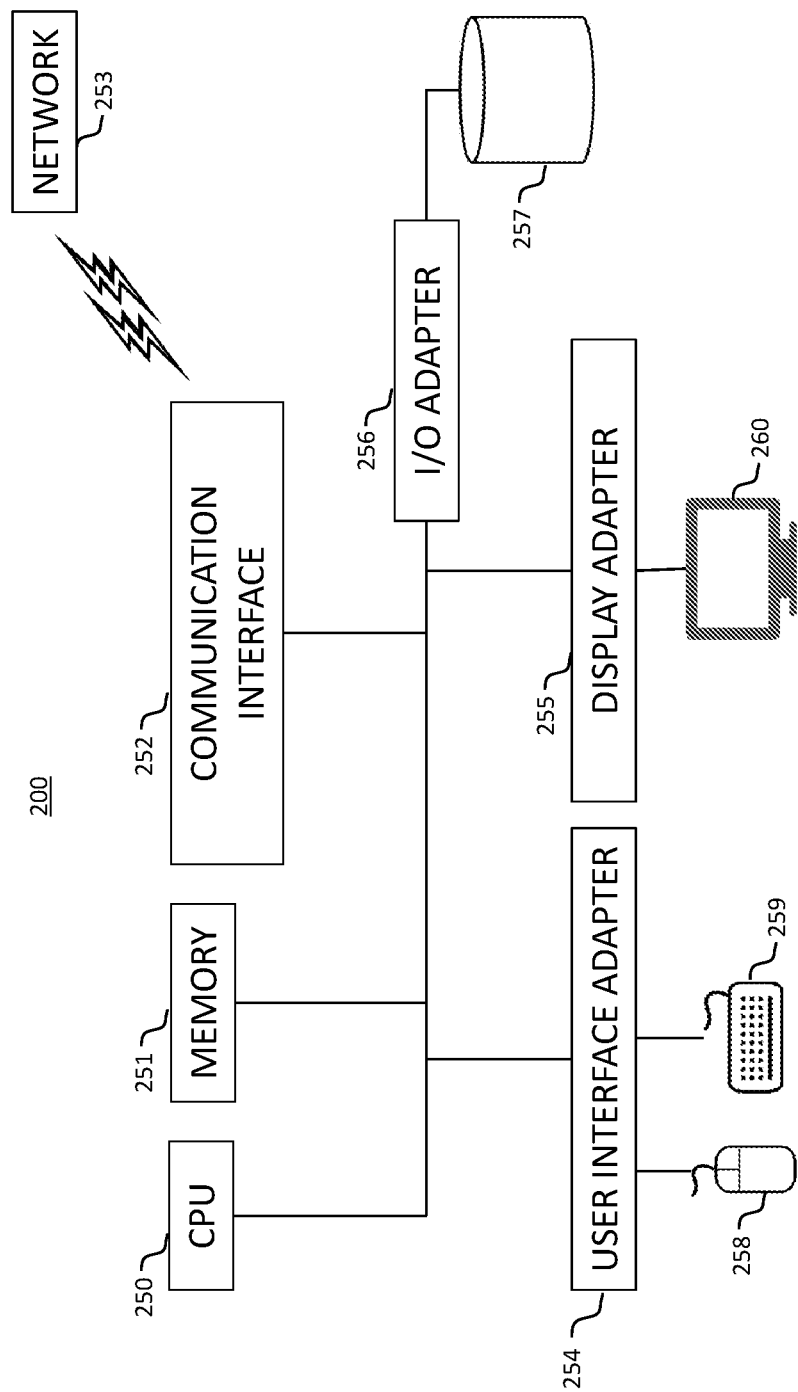
FIG. 2 shows another an example of a computing device system in accordance with an embodiment of the invention.

FIG. 1 schematically illustrates a system 100 according to some embodiments. In some embodiments, the system 100 may be a computing device 200 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 200 may also include a communication interface 252 that connects to a network 253 for communicating with other computing devices 200.

Various methods 600, 700, 1200 and 1700 may be performed by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of methods 600, 700, 1200 and 1700. In these various embodiments, the program may include instructions configured to perform, or cause to be performed, various ones of the instructions associated with execution of various embodiments of methods 600, 700, 1200 and 1700. In some embodiments, methods 600, 700, 1200 and 1700 may include a subset of the associated blocks or additional blocks than those shown in FIGS. 6, 7, 12 and 17. In some embodiments, methods 600, 700, 1200 and 1700 may include a different sequence indicated between various ones of the associated blocks shown in FIGS. 6, 7, 12 and 17.

In some embodiments of the invention, contractual legal terms may be represented in an RDF graph or triple store graph as triples, and the acceptable terms of multiple parties can be captured and perfectly materialised into a compatible negotiated contract with symbolic reasoning, thus automating contract negotiation and generation without the need for further intervention from legal teams. The type of graph is not limited to RDF and could also be a property graph or hypergraph, among other examples. In some embodiments of the invention, the negotiated graph can then be converted back to a text format for final signature. The knowledge graph approach to contract creation extends to self-aware contract management and alerting, meaning it can prevent contract breaches and update terms in accordance with new external legal requirements. Moreover, knowledge graph based contract management enables contract statistics to be automatically aggregated. Managing contracts in a knowledge graph also enables the construction of functional contract-based social and commercial networks where users can find services and negotiate the contract terms within the same network.

Figure 3:
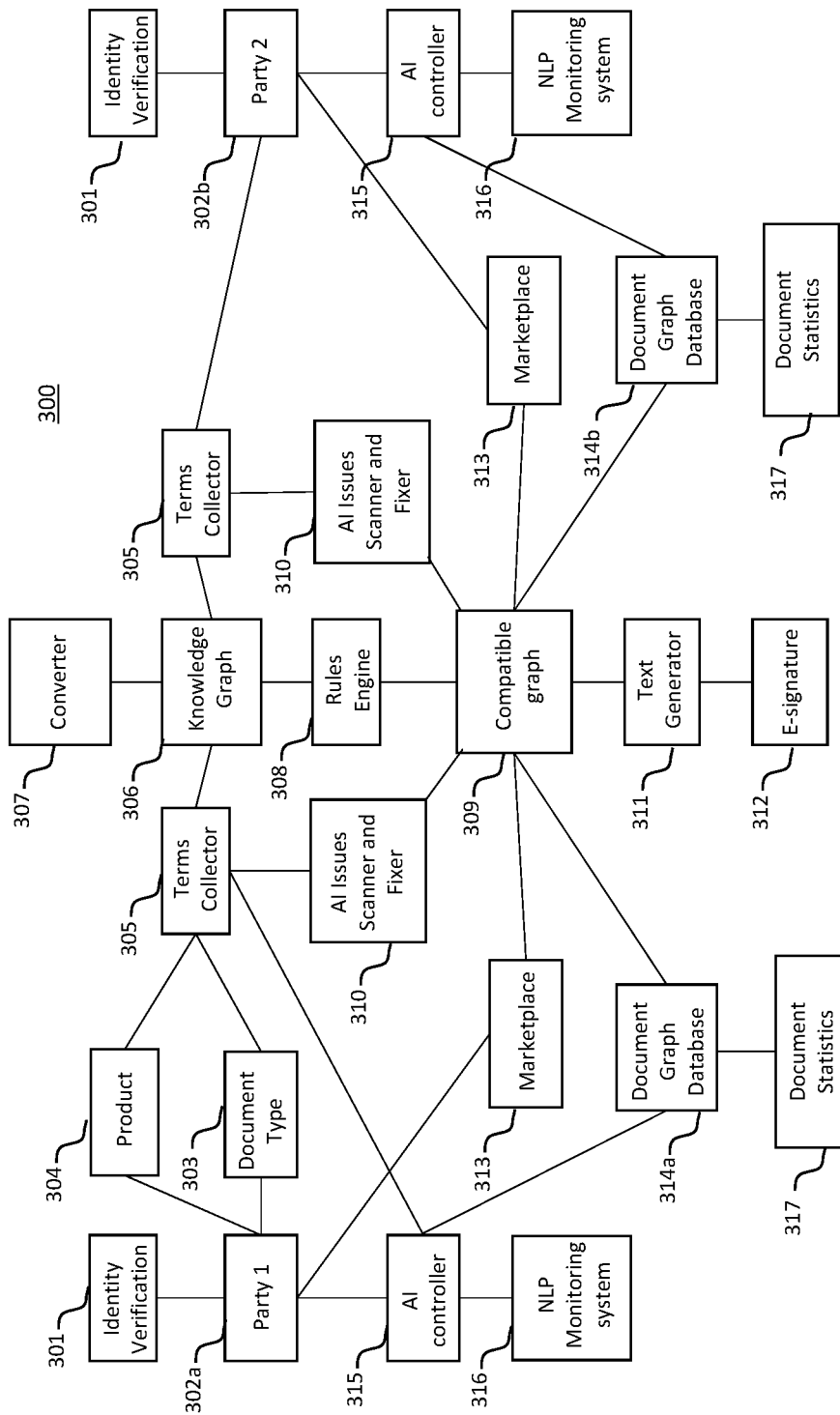
FIG. 3 shows a block diagram illustrating an automatic document generation system in accordance with an embodiment of the invention.

FIG. 3 shows an automatic document generation system 300 in accordance with an embodiment of the invention. In some embodiments of the invention, the document generation system 300 may be configured to, via the stored program, receive an indication of a type of a document 303 to be generated, the type of the document 303 defining a plurality of rules 432 governing terms of the document. In some embodiments of the invention, the document generation system 300 may be further configured to receive a plurality of terms from a plurality of sources including at least a first set of terms of the document from a first source 302a and a second set of terms of the document from a second source 302b, wherein the first source is different from the second source. In some embodiments, the document generation system 300 may be further configured to convert the first set of terms into a first plurality of triples, convert the second set of terms into a second plurality of triples, and apply the plurality of rules governing the terms of the document to the first plurality of triples and the second plurality of triples to generate the knowledge graph 306 and determine whether the first set of terms is compatible with the second set of terms. In some embodiments of the invention, the first set of terms is determined to be compatible with the second set of terms in a case where the plurality of rules 432 governing terms of the document is satisfied. In some embodiments of the invention, the document generation system 300 may be further configured to, in a case where at least one or more first terms of the first set of terms is non-compatible with one or more second terms of the second set of terms, reconcile at least one of the one or more first terms or the one or more second terms that are non-compatible in the generated knowledge graph 306 until the first set of terms is compatible with the second set of terms. In some embodiments of the invention, the document generation system may be further configured to generate the document based at least on the reconciled knowledge graph 309.

In some embodiments of the invention, the document generation system 300 permits a plurality of sources, including a first party 302a and a second party 302b, to interact and negotiate during the document generation process. In some embodiments of the invention, the plurality of sources may include one or more of a user, a commercial entity, or a program configured to provide the terms of the document. In some embodiments, the first party 302a may act as a contract creator or a first source for the contract terms. The first party 302a may input their acceptable terms to an acceptable terms collector 305 for an agreement selected from a library of contract types 303, after which the second party 302b (which acts as a second source for the contract terms) may be invited to participate by inputting their acceptable terms to their own instantation of the acceptable terms collector 305. An identity verification mechanism 301 for the first party 302a and the second party 302b may authenticate the parties by verifying that their login credentials, for example their username and password, are valid. In some embodiments, the first party 302a may then specify the contract type 303 they wish to create with the second party 302b. In some embodiments, the available contract types 303 may be deduced from the document knowledge graph 306, which is generated by converting document templates into knowledge graphs using a template to knowledge graph converter 307. In some embodiments, this conversion may involve converting the terms of a document to triples and extracting the symbolic rules which govern the document. In some embodiments, the consideration of the document is stored as a product 304, which can be selected or created from a product library for the specified contract type 303. In some embodiments of the invention, the product 304 may be equivalent to the subject, purpose or object of the contract. In some embodiments of the invention, the product 304 may be included as a term in the contract terms 305.

In some embodiments of the invention, the acceptable terms of both parties may be converted into triples and stored in the knowledge graph 306. In some embodiments, the knowledge graph 306 may apply a plurality of rules, such as symbolic rules provided by a compatibility rules engine 308, specific to the contract type 303 to materialise a reconciled knowledge graph (compatible graph) 309 where all terms of the plurality of sources are compatible. In some embodiments, the plurality of rules governing the terms of the document may be automatically extracted from a knowledge graph template associated with the type of the document to be generated. In some embodiments, the symbolic rules apply deductive reasoning specific to the contract type which guarantees that the results are facts and not estimations. This means that the outcomes are facts because they simply would not exist if the rules' conditions were not satisfied.

In some embodiments of the invention, when incompatible terms are identified, they may be picked up by the AI issues scanner and fixer 310 and flagged to the users as such. The AI issues scanner and fixer 310 may use symbolic reasoning to suggest to one or more parties new compatible terms which would resolve the issue. In some embodiments, the AI issues scanner and fixer 310 may also use historic data and machine learning to forecast the likelihood that the other party will accept the new terms. In some embodiments of the invention, in the case where at least one or more first terms of the first set of terms is non-compatible with one or more second terms of the second set of terms, the AI issues scanner and fixer 310 may receive historical data pertaining to compatible values for the at least one or more first terms non-compatible with the one or more second terms, and propose a change to at least one of the non-compatible one or more first terms or one or more second terms based on the received historical data. In some embodiments, the document generation system 300 may, in a case where the proposed change is to the one or more first terms, transmit the proposed change to the one or more first terms to the first source 302a and receive updated values for the one or more first terms from the first source 302a. In some embodiments of the invention, the document generation system 300 may, in a case where the proposed change is to the one or more second terms, transmit the proposed change to the one or more second terms to the second source 302b and receive updated values for the one or more second terms from the second source 302b. In some embodiments of the invention, the historical data may include one or more of a collection of past documents, legal rules representing domain knowledge, or information associated with a jurisdiction of the first source 302a or the second source 302b.

When the contract is fully materialised in the contract knowledge graph 306 and all the issues have been resolved by the AI issues scanner and fixer 310, a reconciled knowledge graph (compatible contract graph) 309 is outputted for the selected contract type 303.

In some embodiments of the invention, the compatible contract graph 309 may connect the parties to a marketplace 313 when the contract requires services such as, but not limited to, utility providers and insurance policies to meet a requirement in the contract. In some embodiments of the invention, the quotes in marketplace 313 may be generated based on each party's data and the information from the compatible contract graph 309, which enables the user to purchase a policy in one click and automatically attach it to the contract. This is possible because the marketplace already has all the relevant information on the parties (such as first party 302a and second party 302b) and the terms of the negotiated compatible contract graph 309 to calculate a quote.

In some embodiments of the invention, the compatible contract graph 309 may be converted with a graph to text converter (text generator) 311 to a correctly formatted text document stylised to the party's preference. In some embodiments of the invention, integrated e-signature 312 may permit all parties to sign the contract using the document generation system 300 from a mobile or desktop device. In some embodiments of the invention, the contract may also be printed from the graph to text converter 311 and signed with wet ink if required. In some embodiments of the invention, when the contract has been signed, copies of the compatible contract graph 309 may be stored in each party's contract (document) graph databases 314a and 314b. In some embodiments of the invention, this contract may be queried for answers on, for example but not limited to, the contract's expiration or method for giving notice. In some embodiments of the invention, the contract may also be exported as a downloadable pdf which can then be printed. Because the contracts in contract graph databases 314a, 314b are stored in a common knowledge graph, an AI controller 315 may apply symbolic reasoning to automatically trigger alerts related to the contract's lifecycle and to detect compatibility breaches between existing and new contracts at the level of the acceptable terms collector 305 before they are fully created and negotiated. In some embodiments of the invention, these alerts may be raised to the parties within the system or via email notifications since all their information is stored in the compatible contract graph 309. In some embodiments of the invention, the AI controller 315 may keep track of external legal requirements that might evolve with time and may flag the contracts which are affected. In some embodiments of the invention, the new requirements may be introduced into the document knowledge graph 306 and acceptable terms collector 305 to guarantee that future contracts are compliant with these new requirements.

In some embodiments of the invention, a natural language processing monitoring system 316 collecting user activity data from internal communications such as email feeds may provide a live stream of data into the AI controller 315, which may, in turn, trigger alerts when breaches with existing contracts are detected. In some embodiments of the invention, the natural language processing monitoring system 316 may determine if a change to the law has been made and may flag the affected contracts to the attention of the parties if they require updating.

In some embodiments of the invention, a document statistics aggregator 317 may automatically calculate statistics from the document knowledge graphs 306 stored in the (document) graph databases 314a or 314b such as for example, the average term of a document or the average time to completion.

Figure 4:
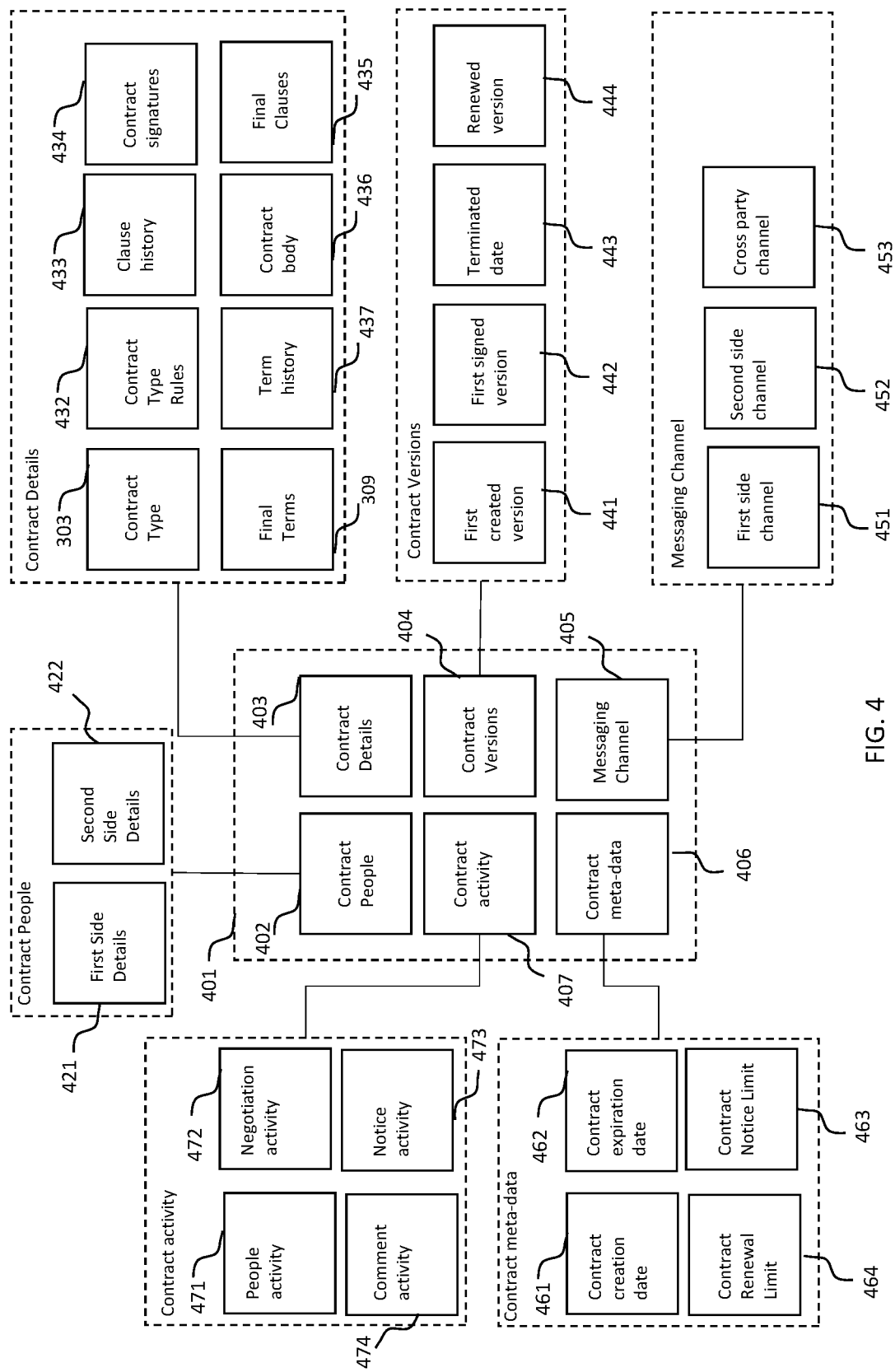
FIG. 4 shows a block diagram illustrating a machine-readable semantic contract in accordance with an embodiment of the invention.

FIG. 4 shows a semantic contract 401 for a semantic document management system. In some embodiments of the invention, the semantic contract 401 may include one or more of contract parties (people) 402, contract details 403, contract version 404, a messaging channel 405, contract meta-data 406, or contract activity 407. In some embodiments of the invention, the semantic contract 401 may be linked to contract people 402 including first side details 421 and second side details 422.

In some embodiments of the invention, the semantic contract 401 may be associated with contract details 403, which characterise one or more of the semantic contract's contract type 303, contract type rules 432 (which may be expressed as logical equations), clause history 433 (which provides an audit trail of the variations that might have been made to the clauses during the negotiation), contract signatures 434 of the relevant contract people 402, the agreed final terms 309 (which may be expressed as parameters), the term history 437, the contract body 436 (which may be the associated text version of the final term 309 parameters and boiler plate language), and the final clauses 435 (which may be mapped from the final term parameters 309 and potentially refined during the clause rephrasing).

In some embodiments of the invention, the semantic contract 401 is aware of its contract versions 404, which may include one or more of the version when the contract was first created 441, the version which was first signed 442, the date the contract might have been terminated 443 and in the event of a renewal, the version of the renewed contract 444.

In some embodiments of the invention, the semantic contract 401 supports a messaging channel 405, which enables the communication between contract people 402. The messaging channel 405 enables internal communication for the first side via a dedicated first side channel 451, internal communication for the second side via a dedicated second side channel 452, and cross-party communication via a cross party channel 453.

In some embodiments of the invention, the semantic contract 401 may store contract meta-data 406, which includes information on when the contract was created 461, when the contract is determined to expire 462, an optional contract notice limit 463, and an optional contract renewal limit 464.

In some embodiments of the invention, the semantic contract 401 may record contract activity 407, which includes people activity 471, such as for example when they receive and open the semantic contract 401, negotiation activity 472 (which may be automatically extracted from the messaging channel 405 and contract details 403), notice activity 473 (which records the exercise of notices when applicable), and comment activity 474 (which records the comments extracted from the messaging channel 405 and contract details 403).

Figure 5:
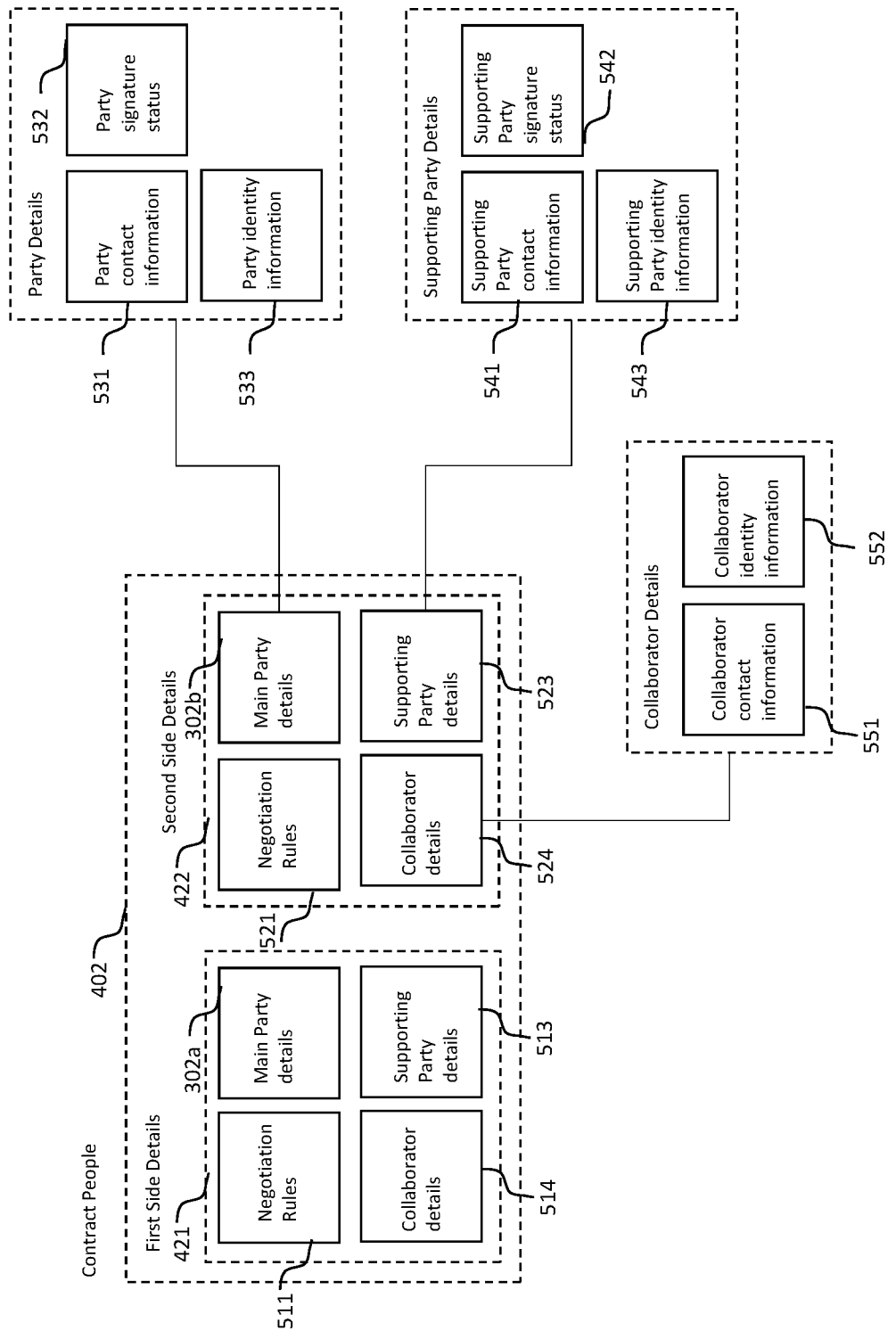
FIG. 5 shows a block diagram of the people elements of a semantic contract in accordance with an embodiment of the invention.

FIG. 5 shows the contract people 402 in more detail, according to some embodiments of the invention. In some embodiments of the invention, the contract people 402 of the semantic contract 401 contain a first side 421 and a second side 422, who are entering into an agreement with each other. In some embodiments of the invention, the first side details 421 contains negotiation rules 511 that influence what terms the first side 421 can accept or not, main party details 302a of the parties to the contract 401, supporting party details 513, of the supporting parties to the contract 401, and collaborator details 514 of parties who don't feature in the contract 401 but participate in the life cycle of the contract, for example sales people or assistants.

In some embodiments of the invention, the second side details 422 contain negotiation rules 521 that influence what the second side 422 can accept or not, main party details 302b of the parties to the contract 401, supporting party details 523 of the supporting parties to the contract 401, and collaborator details 524 of parties who don't feature in the contract 401 but participate in the life cycle of the contract, for example sales people or assistants. The main party details of the first side 302a and the second side 302b include party contact information 531, which is how the sides can access the semantic contract 401 in the semantic document generation system 300, party identity information 533 (which contains their identity information associated with the semantic contract 401), and the party signature status 532 (which indicates if they have signed the contract or not). The supporting party details of the first side 521 and the second side 522 include supporting party contact information 541 (which is how the parties can access the semantic contract 401 in the semantic document generation system 300), supporting party identity information 543 (which contains their identity information associated with the semantic contract 401), and the supporting party signature status 542 (which indicates whether the supporting parties have signed the contract or not). The collaborator party details of the first side 421 and the second side 422 include collaborator contact information 551 (which is how the parties can access the semantic contract 401 in the semantic document generation system 300) and collaborator identity information 543 (which contains their identity information which is recorded for audit purposes).

Figure 6:
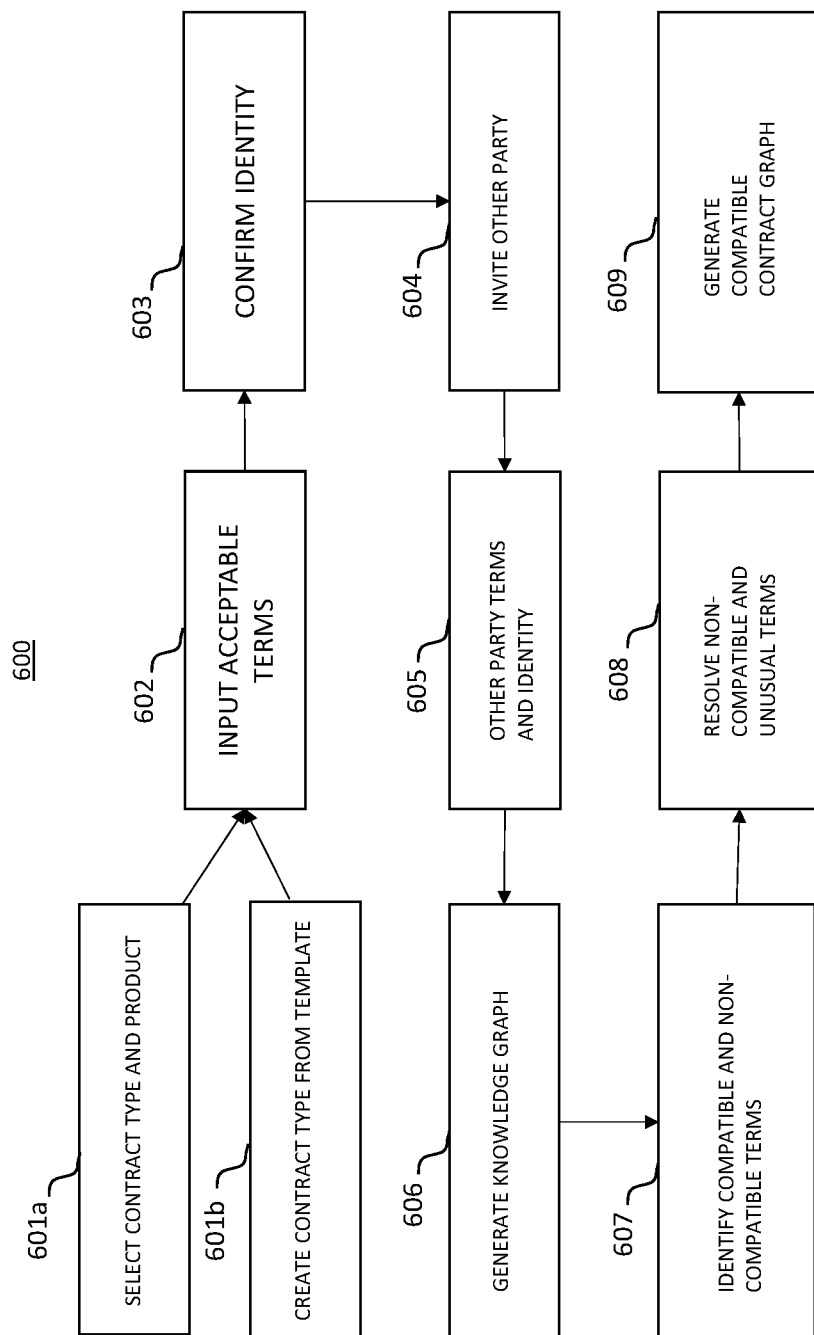
FIG. 6 shows an example of a flow diagram illustrating a method of automatically negotiating and generating a document in accordance with an embodiment of the invention.

FIG. 6 shows a method 600 for modelling contract terms in a graph and automating contract negotiation using symbolic reasoning according to some embodiments of the invention. The generated contract perfectly guarantees the compatibility of the contract. In some embodiments of the invention, the method 600 of generating the document (contract) is executed by a programmed processor. In some embodiments of the invention, the method 600 includes: receiving an indication of a type of a document 303 to be generated, the type of the document 303 defining a plurality of rules 432 governing terms of the document; receiving a plurality of terms from a plurality of sources including at least a first set of terms of the document from a first source 302a and a second set of terms of the document from a second source 302b, wherein the first source is different from the second source; converting the first set of terms into a first plurality of triples; converting the second set of terms into a second plurality of triples; applying the plurality of rules 432 governing the terms of the document to the first plurality of triples and the second plurality of triples to generate the knowledge graph 306 and determining whether the first set of terms is compatible with the second set of terms, wherein the first set of terms is determined to be compatible with the second set of terms in a case where the plurality of rules governing terms of the document is satisfied; in a case where at least one or more first terms of the first set of terms is non-compatible with one or more second terms of the second set of terms, reconciling at least one of the one or more first terms or the one or more second terms in the generated knowledge graph 306 that are non-compatible until the first set of terms is compatible with the second set of terms; and generating the document based at least on the reconciled knowledge graph 309.

In some embodiments of the invention, the method 600 of generating a document, executed by the programmed processor, is stored on a non-transitory computer readable storage medium.

In some embodiments of the invention, in step 601*a*, a user, such as the first party or the first source 302*a*, may initiate a new contract by selecting a contract type 303 which already exists in the library of the document generation system 300. Alternately, the contract type 303 may be selected in step 601*b* by feeding a contract template into the template to knowledge graph converter 307. In some embodiments of the invention, this conversion involves converting the terms into triples and extracting the rules which govern the structure of the agreement. In some embodiments of the invention, the user may select the contract type 303 from steps 601*a* or 601*b*, as well as the product 304 for the contract. In some embodiments of the invention, the product 304 may also be created by the user from the interface and may store information related to the object or consideration of the contract.

In some embodiments of the invention, in step 602, the user 302*a* inputs the acceptable terms for the contract by answering a series of questions. In some embodiments of the invention, after confirming their contract identity in step 603 through an authentication process, they may invite other parties 302*b* they wish to collaborate with in step 604, by specifying the other parties' emails. In some embodiments of the invention, in step 605, the invited users 302*b* will receive links to the contract to input their contract identity and provide their acceptable terms.

In some embodiments of the invention, in step 606, the collected acceptable terms are converted into triples and stored in a knowledge graph 306. In some embodiments of the invention, in step 607, the knowledge (contract) graph 306 applies symbolic reasoning specific to the contract type 303 to materialise a contract and identify the compatible and non-compatible terms. In some embodiments of the invention, non-compatible terms will be flagged in the contract graph 306 as "non-compatible" nodes and the compatible terms will materialise with the term values. In some embodiments of the invention, for non-compatible nodes, the knowledge graph 306 will deduce compatible alternatives in step 608 and utilise historical user data to estimate a likelihood that the suggested option will be accepted by the other party.

In some embodiments of the invention, users may be alerted when nodes are compatible but unusual compared to historical data or industry practices. In some embodiments of the invention, historical data pertaining to standardized values for compatible first terms and second terms may be received, the values of the compatible first terms and second terms may be compared with the standardized values in the historical data, and an alert may be provided in a case where the values of the compatible first terms and second terms deviate from the standardized values in the historical data. In some embodiments of the invention, the historical data includes one or more of a collection of past documents, legal rules representing domain knowledge, or information associated with a jurisdiction of the first source or the second source. Unusual terms could, for example, be terms which are some predetermined multiple standard deviations from the standardized, mean, or median values of the terms, or terms which are valid but impossible to enforce. In another embodiment of the invention, the standardized values may be provided by a business expert having appropriate domain knowledge or industry standards. In some embodiments of the invention, after one or more iterations, the contract graph 306 may materialise completely in step 609 and be guaranteed by the nature of the approach to be fully compatible as to all terms of the document. The users are therefore able to negotiate the concepts autonomously without the aid of legal experts because the rules guarantee their legal validity and compliance. The compatibility guarantee is provided by the fact that rules do not materialise unless conditions are satisfied in the graph. In some embodiments of the invention, the negotiated graph may be converted back to text for signature by both parties.

Figure 7:
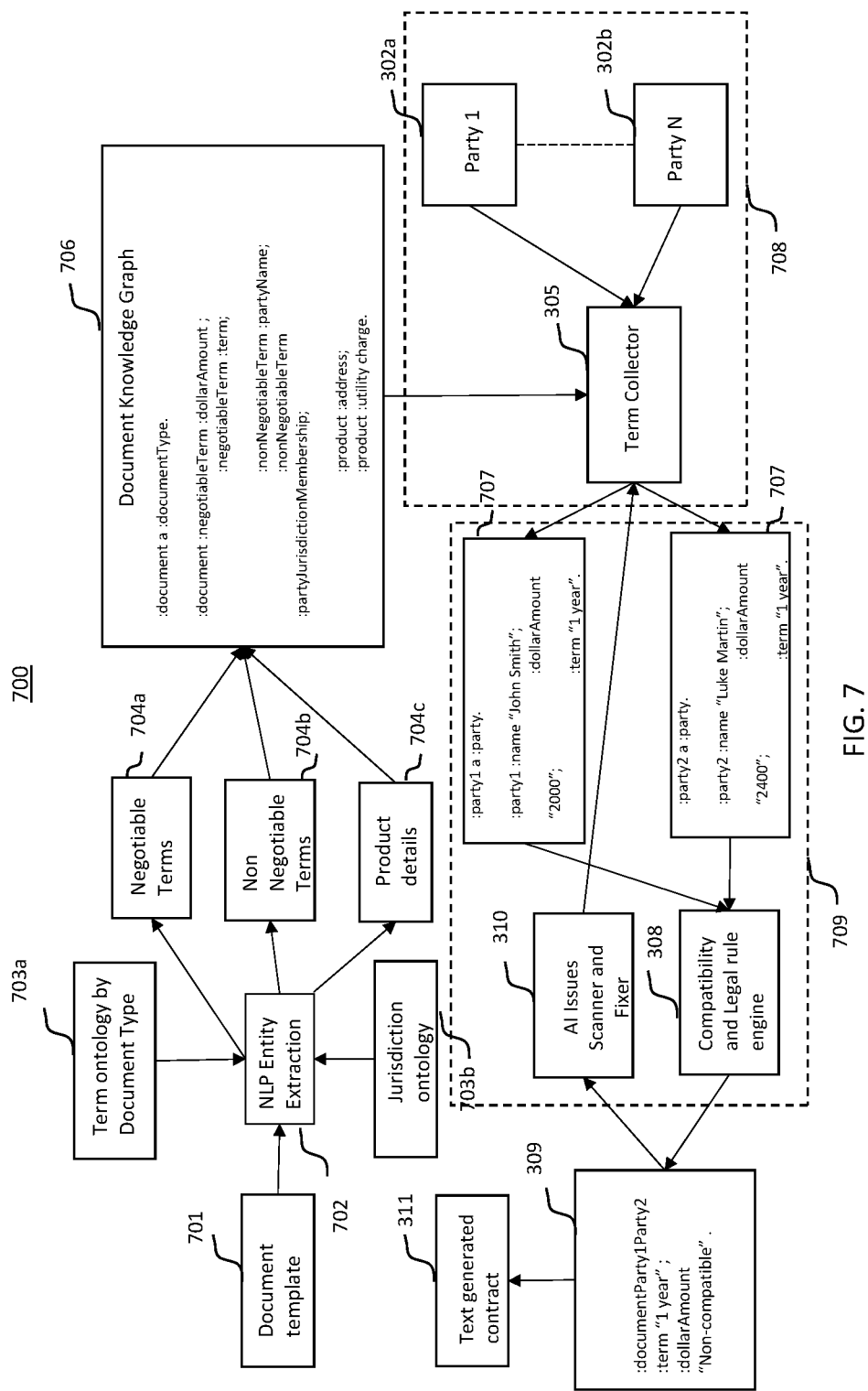
FIG. 7 shows an example of a flow diagram illustrating a method of term extraction, graph modelling, and negotiation in accordance with an embodiment of the invention.

FIG. 7 shows a method 700 for extracting document terms to form a knowledge graph 306 and collect party terms to enable automated contract negotiation on the knowledge graph 306 according to some embodiments of the invention. In some embodiments of the invention, method 700 includes details of steps 601, 606, 607, and 608 of method 600 to model a document as a knowledge graph 306 and enable parties 302*a*, 302*b* to negotiate and agree upon a compatible contract graph 309 which can then be converted to text format. In some embodiments of the invention, in step 701, a raw document template is received or obtained. This document is provided to step 702, which performs a natural language processing (NLP) task to extract entities from the text that are identified in document type term ontologies 703*a* and jurisdiction specific ontologies 703*b*. In some embodiments of the invention, the purpose of step 702 is to extract negotiable terms 704*a*, non-negotiable terms 704*b*, and product details 704*c*. In some embodiments of the invention, product details 704*c* may include information related to the purpose or consideration of the document. In some embodiments of the invention, product details 704*c* may also be non-negotiable terms and can be treated as such, but are considered separately in this specification for clarity and to highlight the fact that a product 304 may be used for future contracts. In some embodiments of the invention, the negotiable terms 704*a*, non-negotiable terms 704*b*, and product details 704*c* are then converted in step 706 into triples to form a knowledge graph 306 that is equivalent of the original document which was provided in step 701. In some embodiments of the invention, the terms of the document may include negotiable terms 704*a* and non-negotiable terms 704*b*, and the knowledge graph 306 may be generated using one or more first triples of the first plurality of triples corresponding to the negotiable terms 704*a* and one or more second triples of the second plurality of triples corresponding to the negotiable terms 704*a*.

In some embodiments of the invention, the knowledge graph 306 includes a first party sub-graph 707 representing the first set of terms from the first source 302*a* and a second party sub-graph 707 representing the second set of terms from the second source 302*b*. The system 300 applies the plurality of rules governing the terms of the document to the first party sub-graph 707 and the second party sub-graph 707, identifies corresponding terms of the first party sub-graph 707 and the second party sub-graph 707 where equivalent values are provided as compatible, and identifies corresponding terms of the first party sub-graph 707 and the second party sub-graph 707 where non-equivalent values are provided as non-compatible.

FIG. 7 also illustrates a simplified example of a party sub-graph 707, according to some embodiments of the invention. In the party sub-graph 707, the document's negotiable terms 704a are the dollar amount and the term, the non-negotiable terms 704b identified in step 706 are the party's name and whether they are a member of a jurisdiction. The product details 704c identified in step 706 contain an address and utility charge. Once the knowledge graph 306 of the document type 303 has been created, parties 302a, 302b who wish to establish a document together can then provide their details to the acceptable terms collector 305 in step 708. In some embodiments of the invention, in step 709, the acceptable terms collector 305 collects the party information required to form a document knowledge graph 306 for those parties and stores their information in party sub-graphs 707. The party sub-graphs 707 are effectively party specific graphs and contain their non-negotiable and negotiable terms. In some embodiments of the invention, the product details 704c are only collected from the party who controls or owns the product 304. For example, the landlord will be expected to provide the property details in the contract with the tenant and no property or product details as such will be provided by the tenant.

In some embodiments of the invention, in step 709, the negotiable terms 704a of each party are fed into the compatibility rule engine 308 (also referred to as "reasoning engine" or "engine"). In some embodiments of the invention, the compatibility rule engine 308 may also include legal rules governing the terms of the document. In these embodiments, the compatibility rule engine 308 may be referred to as compatibility and legal rule engine 308. In some embodiments of the invention, the engine 308 applies symbolic reasoning to the party graphs 707 to materialise a knowledge (document) graph 306 based on the information and contract type 303 of the document. If parties have provided conflicting information, the knowledge graph 306 produced in step 709 will materialise a "non-compatible" node for the associated term. When the parties have provided compatible terms, the knowledge graph 306 will materialise with the "compatible value" based on the logic of the reasoning engine 308. A term may be considered compatible, for example, if the parties 302a, 302b have provided the same values for the term, if the values are equivalent, or if a negotiation position from the engine 308 has provided an acceptable outcome for both parties 302a, 302b.

In some embodiments of the invention, when "non-compatible" nodes are materialised, the associated terms are passed on to the AI issues scanner and fixer 310 (negotiation facilitator component), which may help the parties provide new sets of terms in the acceptable terms collector 305 that will help them reach a fully compatible and materialised reconciled knowledge graph 309. In some embodiments of the invention, when the graph is compatible, it may be converted to a text version using the graph to text converter 311, which translates the graph's terms and product information. In some embodiments of the invention, steps 708 and 709 may be repeated one or more times until all non-compatible terms are reconciled or resolved.

Figure 8:
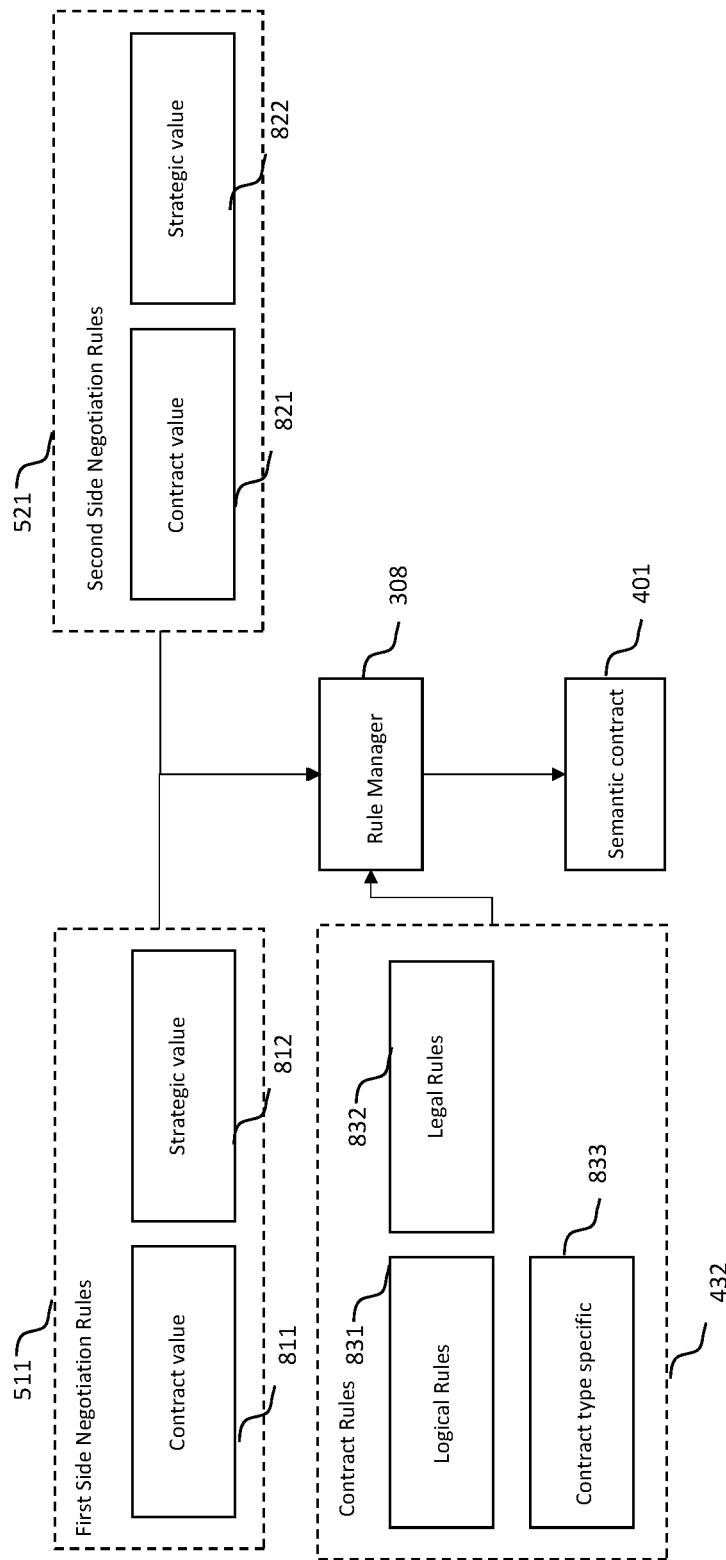
FIG. 8 shows a block diagram of a system for applying the semantic contract negotiation rules to the semantic contract in accordance with an embodiment of the invention.

FIG. 8 is an illustration of a system for applying the first side negotiation rules 511, second side negotiation rules 521, and contract rules 432 to the semantic contract 401, according to some embodiments of the invention. In some embodiments of the invention, the system includes the first side negotiation rules 511, which may include rules related to the contract value 811 as well as rules tied to the strategic value 812 of the semantic contract 401 for the first side 421, the second side negotiation rules 521, which may include rules related to the contract value 821 as well as rules related to the strategic value 822 of the semantic contract 401 for the second side 422, and contract rules 432, which may include the logical rules 831 and legal rules 832 as well as contract type specific rules 833. A rule manager 308 manages the first side negotiation rules 511, the second side negotiation rules 521, and contract rules 432. The system applies condensed rules from the rule manager 840 to the semantic contract 401 to generate the compatible knowledge graph 309.

In some embodiments of the invention, the first side negotiation rules 511 tied to the contract value 811 may include the acceptable contract terms 305 that the first side 421 is willing to accept. The strategic value rules 812 provide alternative acceptable thresholds for the contract terms 305, based on the strategic value of entering into a legal relationship with the second side 422.

In some embodiments of the invention, the second side negotiation rules 521 tied to the contract value 821 may include the acceptable contract terms 305 the second side 422 is willing to accept. The strategic value rules 822 provide alternative acceptable thresholds for the contract terms 305 based on the strategic value of entering into a legal relationship with the first side 421.

In some embodiments of the invention, the contract rules 432 may include logical rules 831 which prevent logically invalid combinations of terms in the contract terms 438, such as for example a notice period longer than the contract duration. The contract rules 432 may also include legal rules 832 that prevent illegal combinations of contract terms 309 from occurring and contract type specific rules 833 that verify that the combinations of contract terms 309 comply with acceptable terms 305 for that contract type 303.

In some embodiments of the invention, the rule manager 840 may aggregate the rules from the first side 511, rules from the second side 521, and the contract rules 432 to filter out redundant rules. The rule manager 308 may then apply the filtered rules to the semantic contract 401 in order to quality control the compatible contract terms 309.

In some embodiments of the invention, the first side negotiation rules 511 and the second side negotiation rules 521 may permit the first side people 421 and the second side people 422 to automatically reach a consensus on the final terms 309 without requiring the intervention of their respective legal counsels to overcome potential obstacles. First side strategic value rules 812 and second side strategic value rules 822 may help the rule manager 308 overcome some of the potential inconsistencies by enabling one side to agree to the terms 305 in certain conditions. The rule manager 308 is a solution for applying custom and standard rules systematically at scale, which enables the semantic contract 401 to compile without needing to know the terms 305, the first side party 302a, or the second side party 302b in advance.

Figure 9:
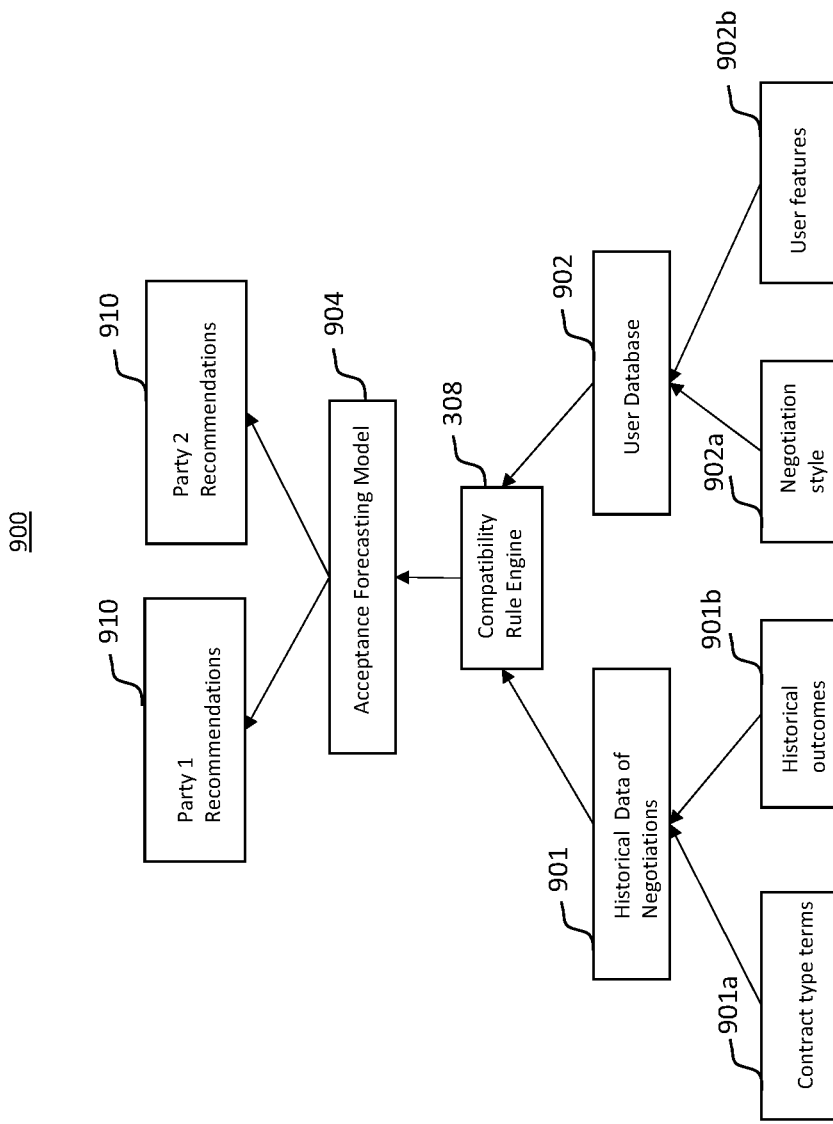
FIG. 9 shows an example of a block diagram illustrating a negotiation facilitating system in accordance with an embodiment of the invention.

FIG. 9 shows a negotiator facilitator system 900 for helping the parties propose a new set of terms which are likely to lead to a compatible document, according to some embodiments of the invention. System 900 details the negotiation facilitator role of the AI issues scanner and fixer 310. The purpose of the facilitator is to help the parties resolve the non-compatible terms flagged by the reasoning engine 308. In some embodiments of the invention, a forecasting model 904 may present to each of the first party 302a and second party 302b sets of new terms (recommendations 910) that are likely to resolve the incompatibilities. In some embodiments of the invention, these new terms may be provided by a statistical forecasting model 904 that is trained on samples of historical data of negotiations 901 and a user database 902. In some embodiments of the invention, these samples may be obtained by filtering the databases 902 using the compatibility rule engine 308, which guarantees that any of the suggestions from the model will be compatible with the document (such as contract type 303) and existing compatible terms 309.

In some embodiments of the invention, the historical negotiation data 901 may include an acceptance outcome 901*b* of a new term relative to a bag of agreed terms 901*a* for the given document type. The user database 902 may include party specific metrics which can improve the likelihood of the terms being accepted by the other party, such as their negotiation style 902*a* and their user features (industry, sector or geography) 902*b*. The negotiation style captures their likelihood to accept the other party's recommendations as well as their average response time.

Figure 10:
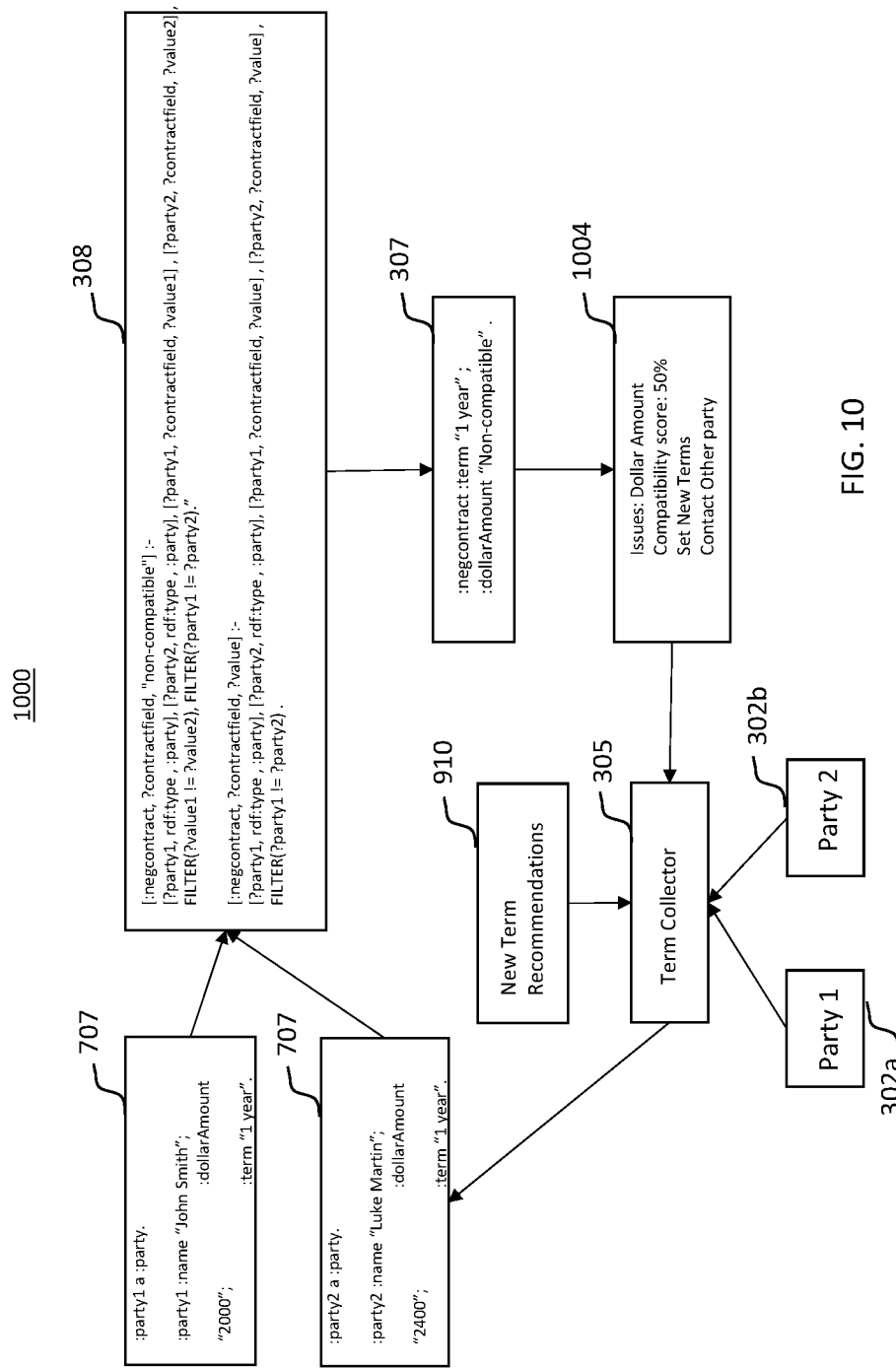
FIG. 10 shows an example of a block diagram illustrating an example of two parties negotiating a document with the document generating system in accordance with an embodiment of the invention.

FIG. 10 shows a system 1000 of how the symbolic rules of system 432 intervene in the negotiation process, according to some embodiments of the invention. System 1000 includes details of the algorithmic aspects of the compatibility rule engine 308. In some embodiments of the invention, after the terms of each party are converted to triples to form the party sub-graphs 707, a set of rules are applied by the compatibility rule engine 308 to materialise the negotiated document. In some embodiments of the invention, these rules may be Datalog® rules. Datalog® is an open-source rule language for the rule engine 308. These rules could be specified in other rule languages such as Prolog® for example or as logical equations composed of if then statements written in a generic programming language. A simple example of the compatibility rules 831 is a subset of the rules of engine 308. Datalog® rules start with a "head" set of triples which are materialised if the pattern following the symbol ":-" in the exemplar rules shown below is identified in the graph. The rules in engine 308 will materialise the term values of the parties if they are equivalent, and materialise a non-compatible node if they are not equivalent. In the simple example outputted from the rules engine 308, the negotiated contract outputted contains a non-compatible node for the ":dollarAmount" predicate but the document's term has been accepted by other parties as one year. An overall compatibility score is presented to the parties in the issues and compatibility dashboard 1004 as well as the predicates which need to be solved. The parties are also presented with the new predicate suggestions 910 from the AI issues scanner and fixer (negotiator facilitator) 310, which they can choose to act on directly by accepting and confirming those terms in the acceptable terms collector 305. Alternatively, they can contact the other party via the cross party messaging channel 453 or suggest their own set of terms in the acceptable terms collector 305. New party sub-graphs 707 are then created and the cycle repeats until the contract is fully materialised with no "non-compatible" nodes and the compatibility score in the dashboard 1004 has reached 100%.

A non-limiting embodiment of the invention will be described in the case of a simple non-disclosure agreement (NDA) between two parties. A non-disclosure agreement's product details 704*c* would simply be the purpose of the disclosure, for example "a potential business engagement" between the two parties. The non-negotiable terms 704*b* would be each party's name, address and business details. The negotiable terms 704*a* may be, but are not limited to, the coverage i.e. mutual disclosure or one-way, the term of the disclosure, and the content of the disclosure.

In this example, the simplified knowledge graph of the non-disclosure agreement would therefore be the following:
:nda a:contract.
:nda:negotiableTerm:term;
   :negotiableTerm:coverage;
   :negotiableTerm:content;
   :nonNegotiableTerm:party1Name;
   :nonNegotiableTerm:party1address;
   :nonNegotiableTerm:party2Name;
   :nonNegotiableTerm:party2address;
   :product :purpose.

After collecting each party's terms in the acceptable terms collectors 305, their respective sub-graphs 707 could be, for example, the following:
:party1:coverage "one-way";
   :content "commercial information";
   :name "John Smith";
   :purpose "a potential business relationship".
:party2:coverage "mutual";
   :content "commercial information";
   :name "Luke Martin";
   :purpose "a potential business relationship".

Figures 11A, 11B:
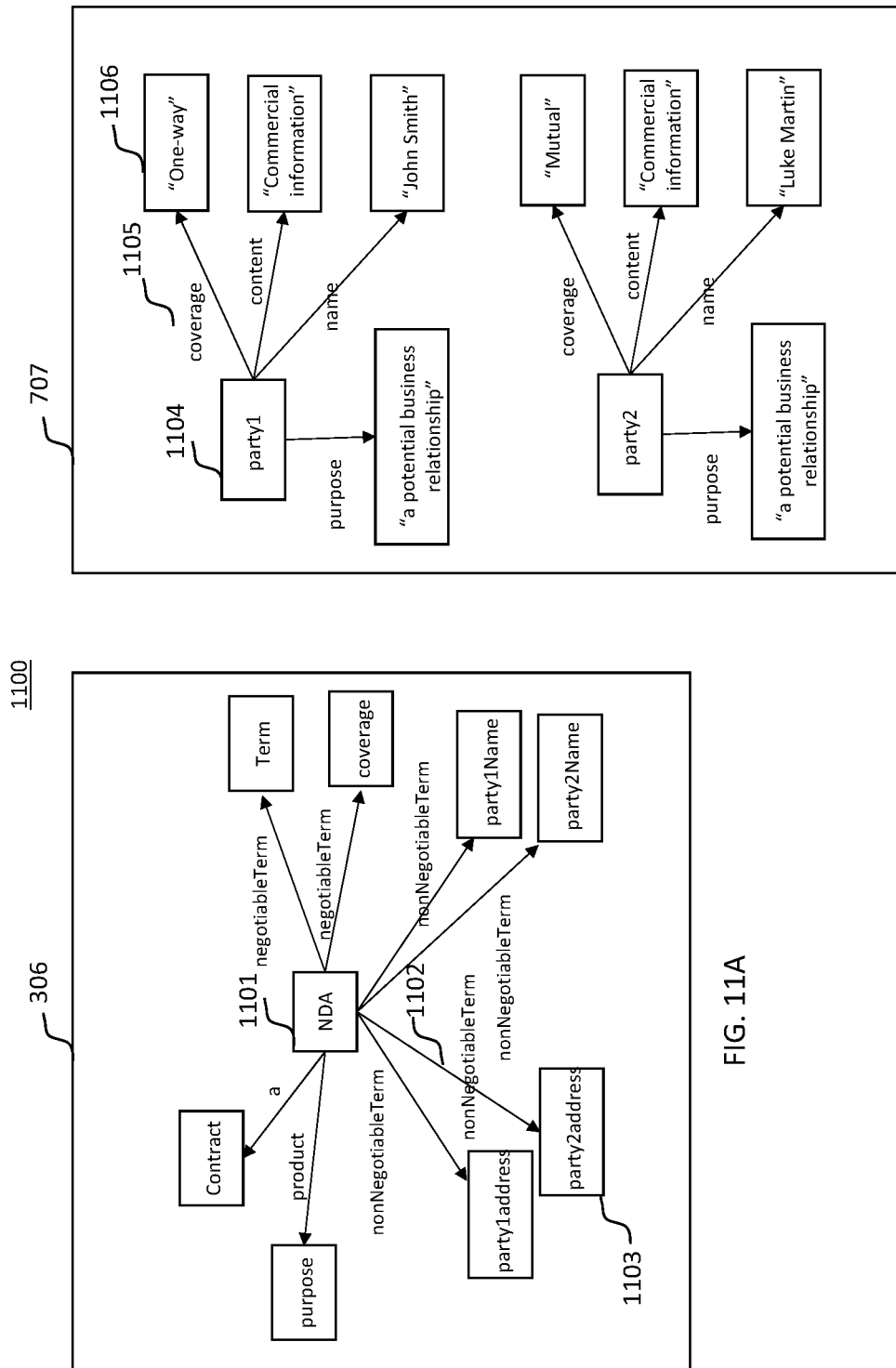
FIGS. 11A and 11B show examples of a block diagram illustrating the graph representations of the party and term models used in the document generating system in accordance with an embodiment of the invention.

FIGS. 11A and 11B show visual representations of the document graph 306 and party knowledge sub-graphs 707 in system 1100, according to some embodiments of the invention. The document knowledge graph 306 represents the subject, which in this case is an NDA 1101, and its respective properties modelled as object 1102 and predicate 1103 relationships. The main node is the NDA 1101 and the edges 1102 tie the NDA 1101 to the predicate 1103. For example, the NDA 1101 has a non-negotiable term 1102 that is the second party's name 1103. The graphs 707 of the party are modelled in a similar way where the main node 1104 is the first party, the object coverage 1105 is an edge, and the predicate 1106 is "one-way". Graphs are flexible and expressive, which means that they scale easily to more properties and complex relationships which are often present in contracts and documents.

In this example, the first party requested a one-way coverage and the second party requested mutual coverage. While the coverage term is non-compatible, the parties are aligned on all the other terms. As a result, the compatibility rule engine 308 will signal to each party that the coverage of the agreement requires some form of reconciliation.

A simple rule executed by the compatibility rule engine 308 will determine which terms are non-compatible. This would be, for example, that "if the first party has a negotiable term of value 1 and the second party has a negotiable term of value 2, and value 1 and value 2 are different, then that negotiable term of the non-disclosure agreement is non-compatible."

In some embodiments of the invention, this rule may be expressed the following way in Datalog®:
[:nda, :term, "non-compatible"]:-
[?party1, rdf:type, :party], [?party2, rdf:type , :party],
[?party1, ?term, ?value1], [?party2, ?term, ?value2], [?term, a, :negotiableTerm],
FILTER(?value1!=?value2) , FILTER(?party1!=?party2).

A simple rule executed by the compatibility rule engine 308 to determine which terms are compatible would be that "if the first party has a negotiable term of value 1 and the second party has a negotiable term of value 2, and value 1 and value 2 are equivalent, then that negotiable term of the non-disclosure agreement is compatible for the parties and equal to that value. In some embodiments of the invention, this rule may be expressed the following way in Datalog®:

[:nda, :term, ?value]:-[?party1, rdf:type, :party], [?party2, rdf:type, :party],
[?party1, ?term, ?value ], [?party2, ?term, ?value], [?term, a, :negotiableTerm],
FILTER(?party1!=?party2).

The non-compatible terms are then communicated by the negotiator facilitator 310 to each party, who will then have the option to choose the other party's coverage position or propose a different set of terms in the acceptable terms collectors 305 to keep their position. In some embodiments of the invention, the recommendations from the negotiation facilitator 310 may include the scores from the forecasting model 904 to help inform the parties' decisions as well as first side negotiation rules 511 and second side negotiation rules 521. These terms are then fed back into the knowledge graph 306 and the previous applied rules from the engine 308 again computes and materialise compatible terms. If the contract is a complete reconciled graph 309, with no non-compatible nodes, it will then be converted to text by matching the negotiated terms to the relevant clauses and field values by the graph to text converter 311.

Figure 12:
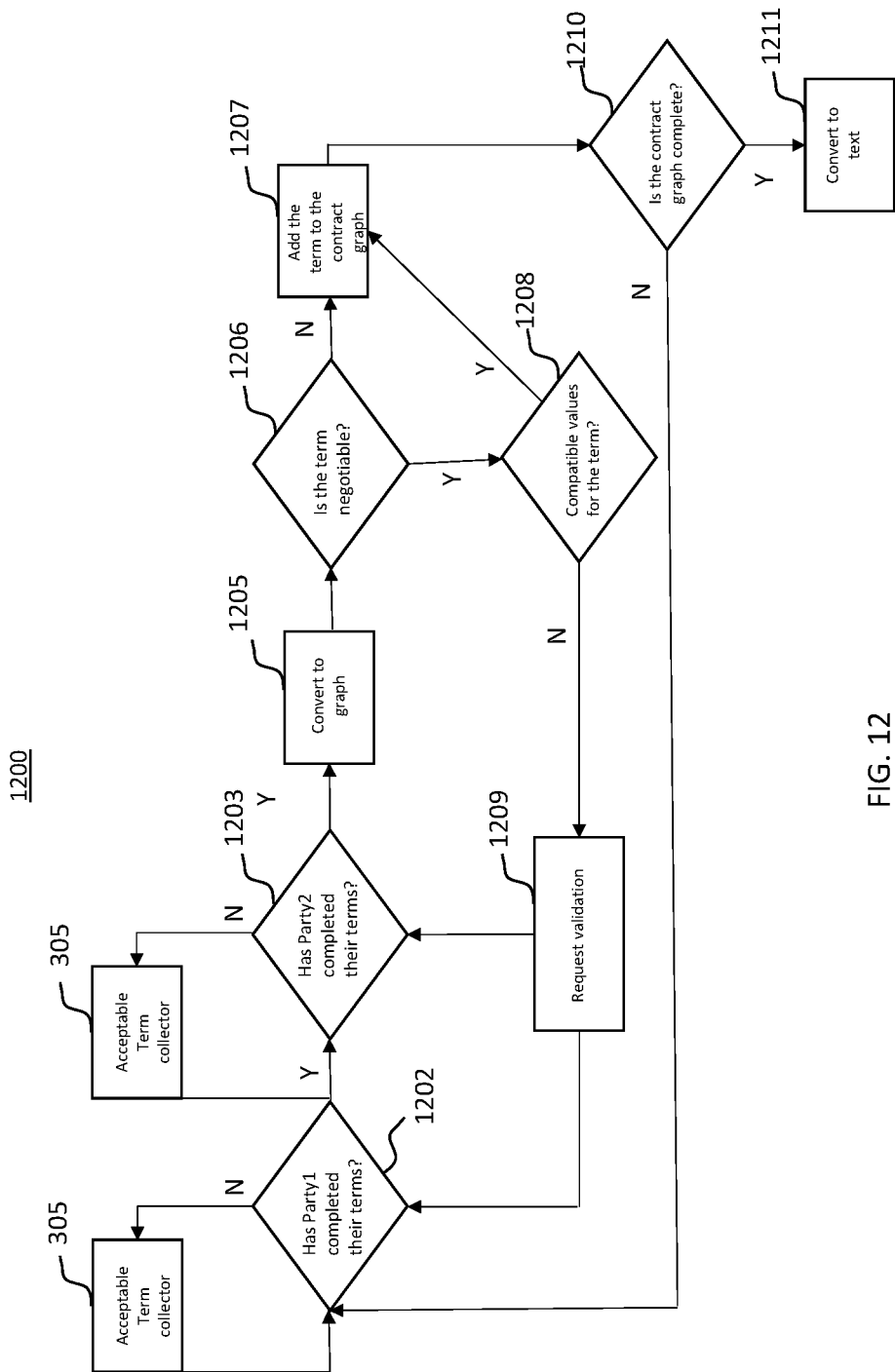
FIG. 12 shows an example of a flow diagram illustrating a method of the decision making process of the document generating system in accordance with an embodiment of the invention.

FIG. 12 shows the decision-making process in method 1200, which guides the document generation, according to some aspects of the invention. The flowchart of method 1200 illustrates how the negotiation is structured. The acceptable terms collector 305 collects the details of the terms from the first party 302a in step 1202. Next, in step 1203, the second party 302b is asked to provide their terms in the acceptable terms collector 305. In step 1205, the terms from the first party 302a and the second party 302b are converted to triples to generate the party sub-graphs 707 and the rules from the engine 308 are imported. In step 1206, the rules from the engine 308 will effectively check if the terms in the sub-graphs 707 provided by the parties are negotiable 704a or not 704b, or if they are product details 704c. Product details 704c can also be considered as non-negotiable. The non-negotiable terms in 704b are then added directly to the contract graph 309 in step 1207. The terms which are negotiable 704a are compared for compatibility by the rule engine 308 in step 1208, and if they pass the rules they are materialised in the contract graph 309 in step 1207. The terms which did not pass the rules 308 are fed back to the AI negotiation facilitator 310 to collect new terms from the parties from their respective acceptable term collectors 305 in step 1209. The process is repeated until the compatible reconciled contract graph 309 has been completely materialised in step 1210 and it can then be converted to a text form by the converter 311, in step 1211 for review and signature.

Figure 13:
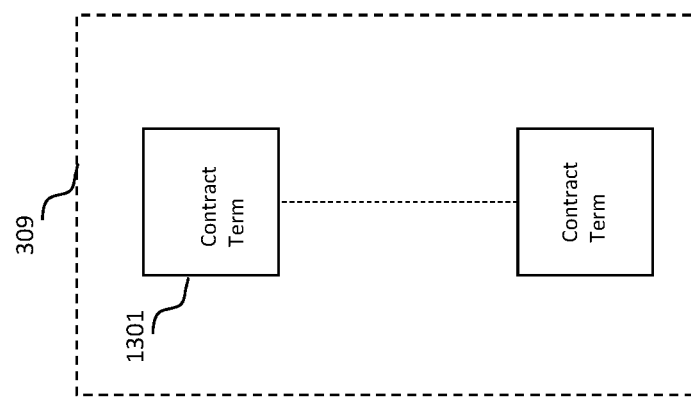
FIG. 13 shows a block diagram of contract term set structure of a semantic contract in accordance with an embodiment of the invention.

FIG. 13 shows a set of contract terms 309. In some embodiments of the invention, the terms 309 of the semantic contract 401 are composed of a set of individual contract terms 1301, which are shown in more detail in FIG. 14.

Figure 14:
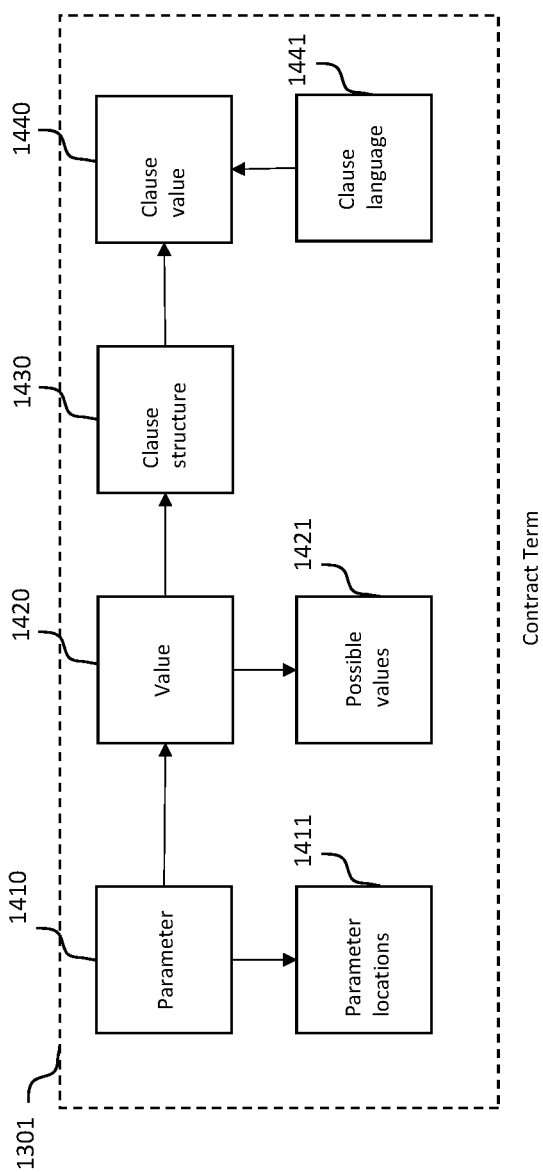
FIG. 14 shows a block diagram of the semantic contract term structure in accordance with an embodiment of the invention.

FIG. 14 shows the structure of a contract term 1301. In some embodiments of the invention, the contract term 1301 may include a contract parameter 1410 (which has one or multiple parameter locations 1411 in the semantic contract 401), a value 1420 (which can be chosen from a plurality of possible values 1421), a clause structure 1430, a clause value 1440, and clause language 1441.

In some embodiments of the invention, the clause structure 1430 may determine if and how the contract parameter's value will impact the wording and structure of the clause. In some embodiments of the invention, the clause language 1441 determines the possible ways the clause 1440 can be worded differently without changing the value 1420 of the contract term parameter 1410.

Figure 15:
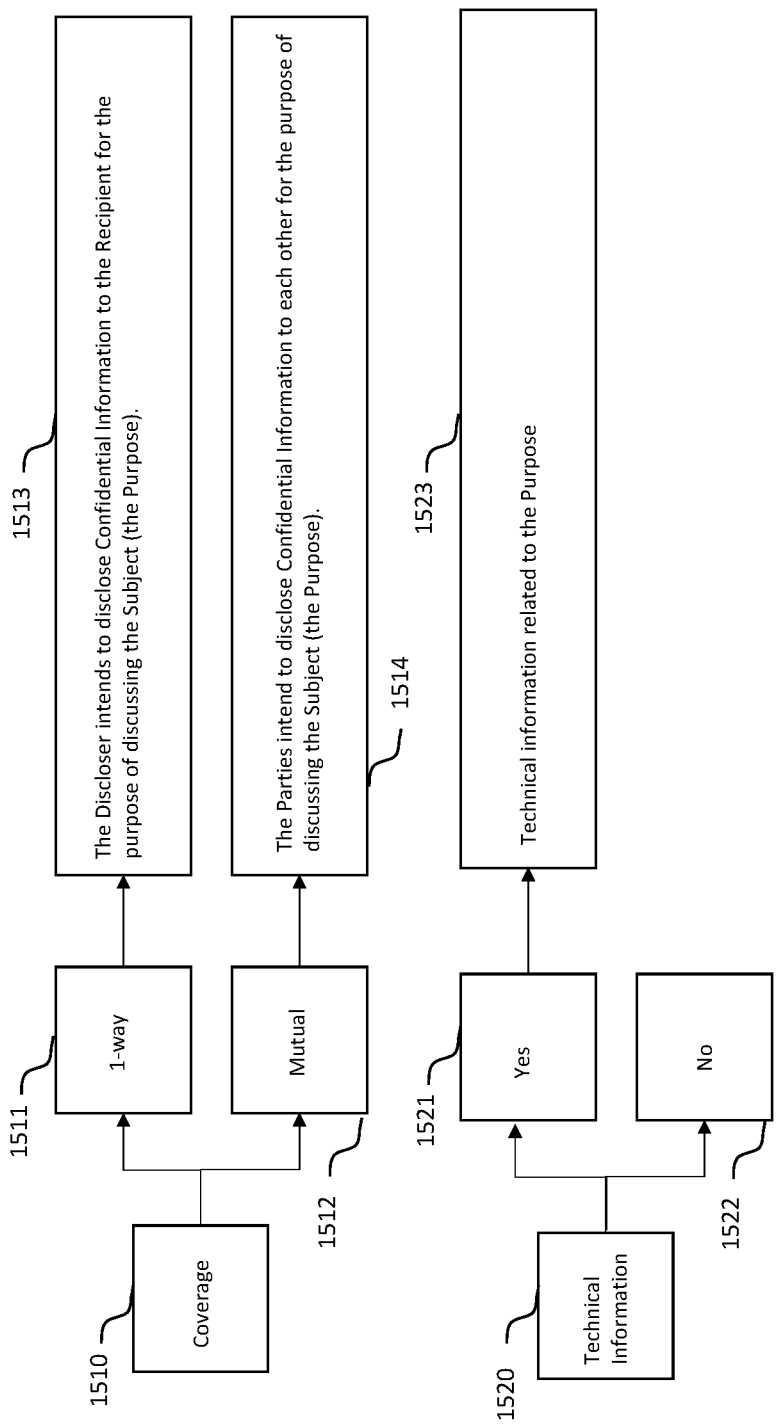
FIG. 15 shows an example of a block diagram illustrating the semantic contract terms in accordance with an embodiment of the invention.

FIG. 15 shows some examples of semantic contract terms 1500. In some embodiments of the invention, in the context of a non-disclosure agreement, the contract term coverage 1510 has two possible contract term values 1421, which are one-way 1511 and mutual 1512. These values 1511 and 1512 respectively lead to one-way wording 1513 and mutual wording 1514 in the contract body 436. In some embodiments of the invention, in the context of a non-disclosure agreement, the contract term technical information 1520 has two possible contract term values 1421, which are yes 1521 and no 1522. These values 1521 and 1522 respectively lead to wording related to the disclosure of technical information 1523 and the absence of wording related to the disclosure of technical information. The semantic contract terms 1500 enable the text generator 311 to configure the text version of the compatible graph 309.

Figure 16:
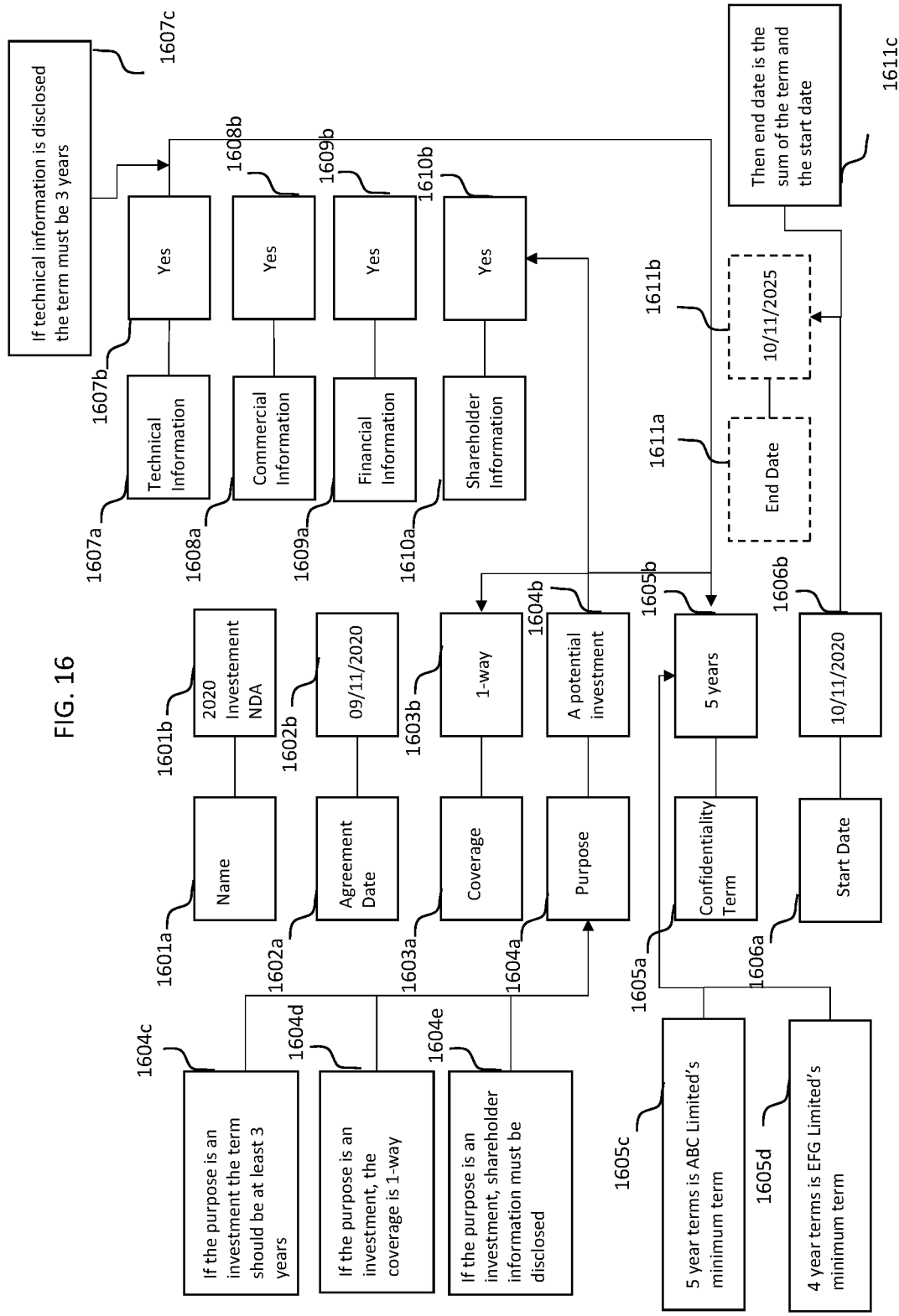
FIG. 16 shows an example of a block diagram illustrating the non-disclosure semantic contract and associated rules in accordance with an embodiment of the invention.

FIG. 16 shows a more detailed example of the semantic contract terms 309 and rules from the rule manager 308 in the context of an example non-disclosure agreement, according to an embodiment of the invention. In some embodiments of the invention, a non-disclosure agreement may include one or more of a name term 1601a associated with the value of "2020 Investment NDA" 1601b, an agreement date term 1602a associated with the value of "09/11/2020" 1602b, a coverage term 1603a associated with the value of "one-way" 1603b, a purpose term 1604a associated with the value of "potential investment" 1604b, a confidentiality term 1605a associated with the value of "five years", a start date term 1606a associated with the value of "10/11/2020" 1606b, a technical information term 1607a associated with the value of "yes" 1607b, a commercial information term 1608a associated with the value of "yes" 1608b, a financial information term 1609a associated with the values of "yes" 1609b, a shareholder information term 1610a associated with the value of "yes" 1610b, or an end date term 1611a associated with the value "10/11/2025" 1611b. In some embodiments of the invention, the contract 401 may include contract type specific rules 432, such as the term rule 1604c, the coverage rule 1604d, and the shareholder information disclosure rule 1604e. In some embodiments of the invention, the contract 401 may include legal rules 832, such as the technical information rule 1607c. In some embodiments of the invention, the contract 401 may include logical rules 831, such as the end date rule 1611c (which automatically deduces the value of the end date 1611b based on the start date value 1606b), and the confidentiality term value 1605b. In some embodiments of the invention, the contract 401 may include first side rules 411, such as the minimum term for ABC Limited 1605c. In some embodiments of the invention, the contract 401 may include second side rules 421, such as the minimum term for EFG limited 1605d. The confidentiality term of five years 1605b may be deduced from the minimum term rules from the contract type rule 1604c, the first side rule 1605c, the second side rule 1605d, and the technical information rule 1607c.

Figure 17:
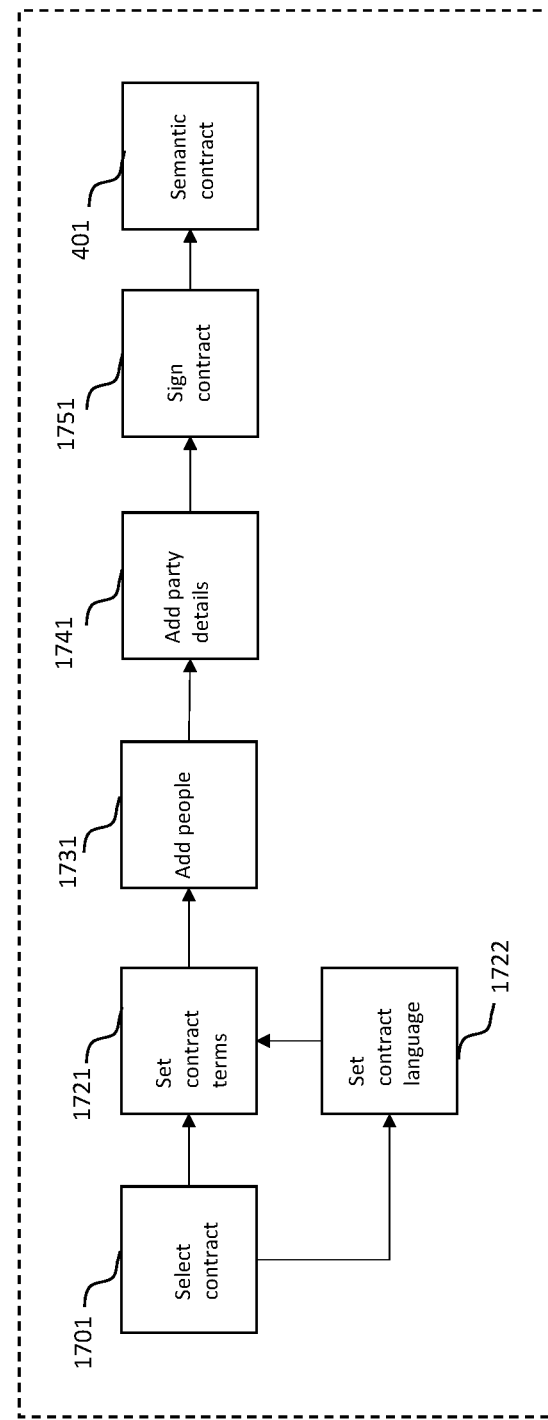
FIG. 17 shows a flow diagram for a method of generating the semantic contract in accordance with an embodiment of the invention.

FIG. 17 shows a method 1700 for generating a semantic contract 401 according to some embodiments of the invention. In some embodiments of the invention, the contract type is specified in step 1701. For example, the contract type 303 may be a "non-disclosure agreement." In step 1721, the contract terms 305 for the selected contract type 303 are set. The contract terms 305 that can be set may be, by default, compatible with the rules from the contract rule manager 308. In step 1722, the contract term language is set. The contract language enables the selection of clause language 1441, which offers the expression of the concepts in equivalent ways. For example, the number of paid days of holiday for an employee in an employment contract may be expressed as a minimum excluding public holidays or a maximum including public holidays. In step 1731, the contract people 402 to the contract are added. In some embodiments of the invention, the contract people 402 may add their party details to the contract in step 1741. In some embodiments of the invention, the contract people 402 may also add their negotiation rules 511 and 521 in step 1741, which will update the output from the rule manager 308. Once the contract is negotiated and the contract people 402 agree to the contract terms, the contract parties from the first side 302*a* and contract parties from the second side 302*b* may add signature information 312 to the contract in step 1751.

Figure 18:
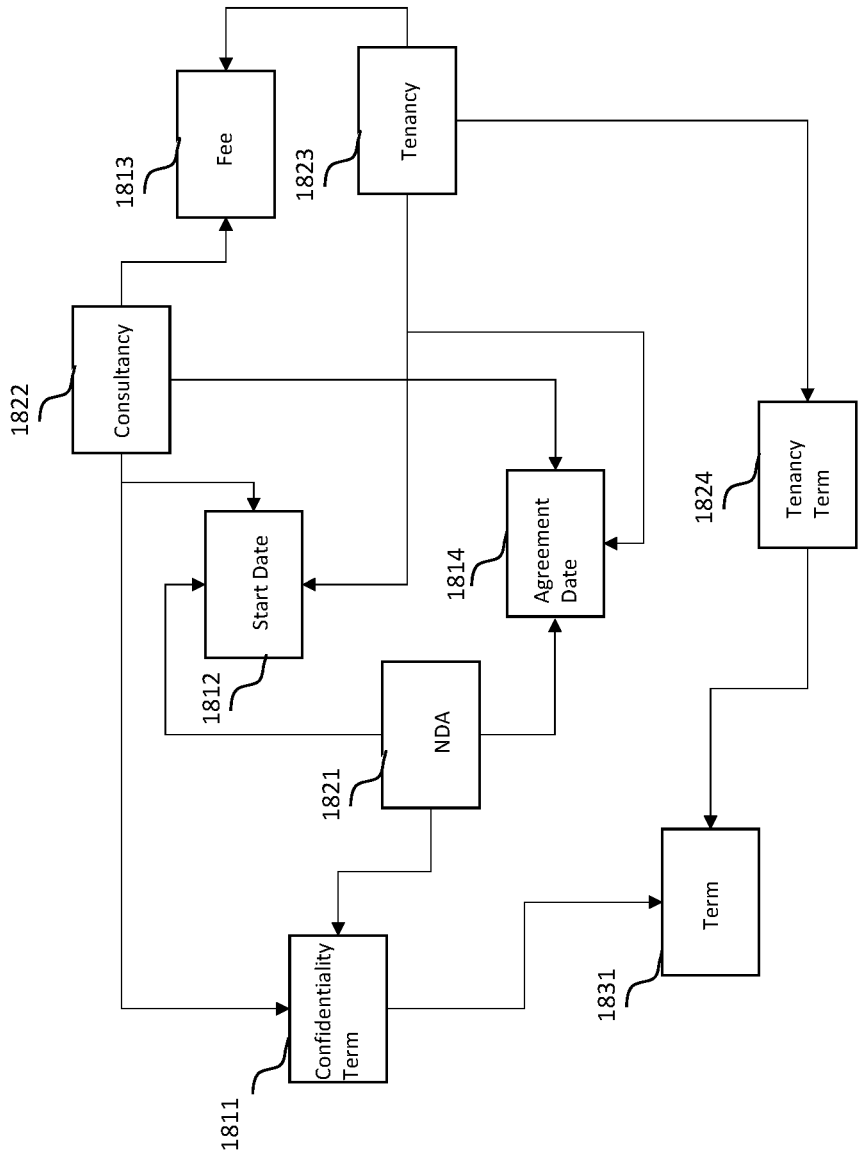
FIG. 18 shows an example of an ontology of semantic contract terms and their associated contracts in accordance with an embodiment of the invention.

FIG. 18 shows an example of an ontology of semantic contract terms and their associated contracts in accordance with an embodiment of the invention. In some embodiments of the invention, a confidentiality term 1811 may be part of a Non-Disclosure Agreement (NDA) 1821, or part of a consultancy agreement 1822. In some embodiments of the invention, a start date 1812 and an agreement date 1814 may be part of the NDA 1821, a part of the consultancy agreement 1822, or a part of a tenancy agreement 1823. In some embodiments of the invention, a fee 1813 can be part of a consultancy agreement 1822 and a tenancy agreement 1813. In some embodiments of the invention, the tenancy agreement 1823 may have a tenancy term 1824. In some embodiments of the invention, the confidentiality term 1811 and the tenancy term 1824 may be a part of the term 1831 class. In some embodiments of the invention, the shared contract terms 601 of different contract types 303 and the connection of concepts through common classes, like the term 1831, mean that aggregate document statistics 317 can be easily calculated across semantic contracts 401 stored in a document graph database 314, even if they're of different types 303. For example, an average term can be calculated from the common term 1831 and aggregate revenue can be calculated from the fee 1813 from the consultancy contract 1822 and tenancy contract 1823. For example, the average duration between signatures of contracts stored in the document graph database 314 can also be calculated.

Figure 19:
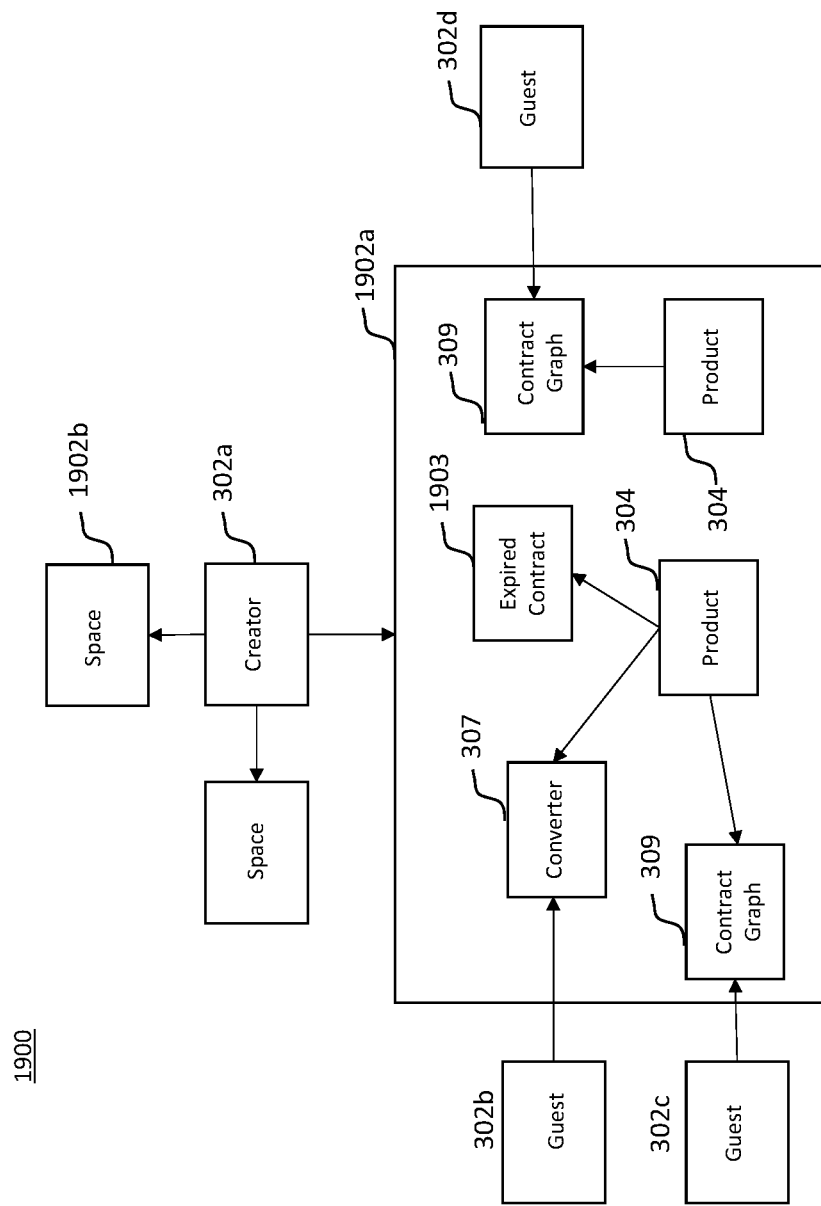
FIG. 19 shows an example of a block diagram illustrating a user's contract and relationship management system in accordance with an embodiment of the invention.

FIG. 19 shows a user's contract and relationship management system 1900, according to some embodiments of the invention. System 1900 details how contracts and relationships are managed. Each creator, such as the first party 302*a*, can create spaces 1902*a*, 1902*b* where contracts can be drafted with invited guest users 302*b*, 302*c*, 302*d* for stored products 304. A space 1902*a*, 1902*b* is equivalent to a folder in terms of its functionality. Multiple guests can be invited to the same space 1902*a* but guests only have access to the contracts, represented by reconciled knowledge graphs 309, and products 304 for which they are a party. Guests may also interact with templates for various document types through the template to knowledge graph converter 307. Products 304 are stored in space 1902*a* and by contract type 303 and can be used for multiple contracts. This can either occur simultaneously, such as in the case of a job role, or sequentially, when the contract for a product has expired but a new contract can be drafted (for example in the case of rental properties). Users can also have multiple spaces 1902*a*, 1902*b*, which gives them flexibility in terms of how they wish to manage their contracts and relationships.

Figure 20:
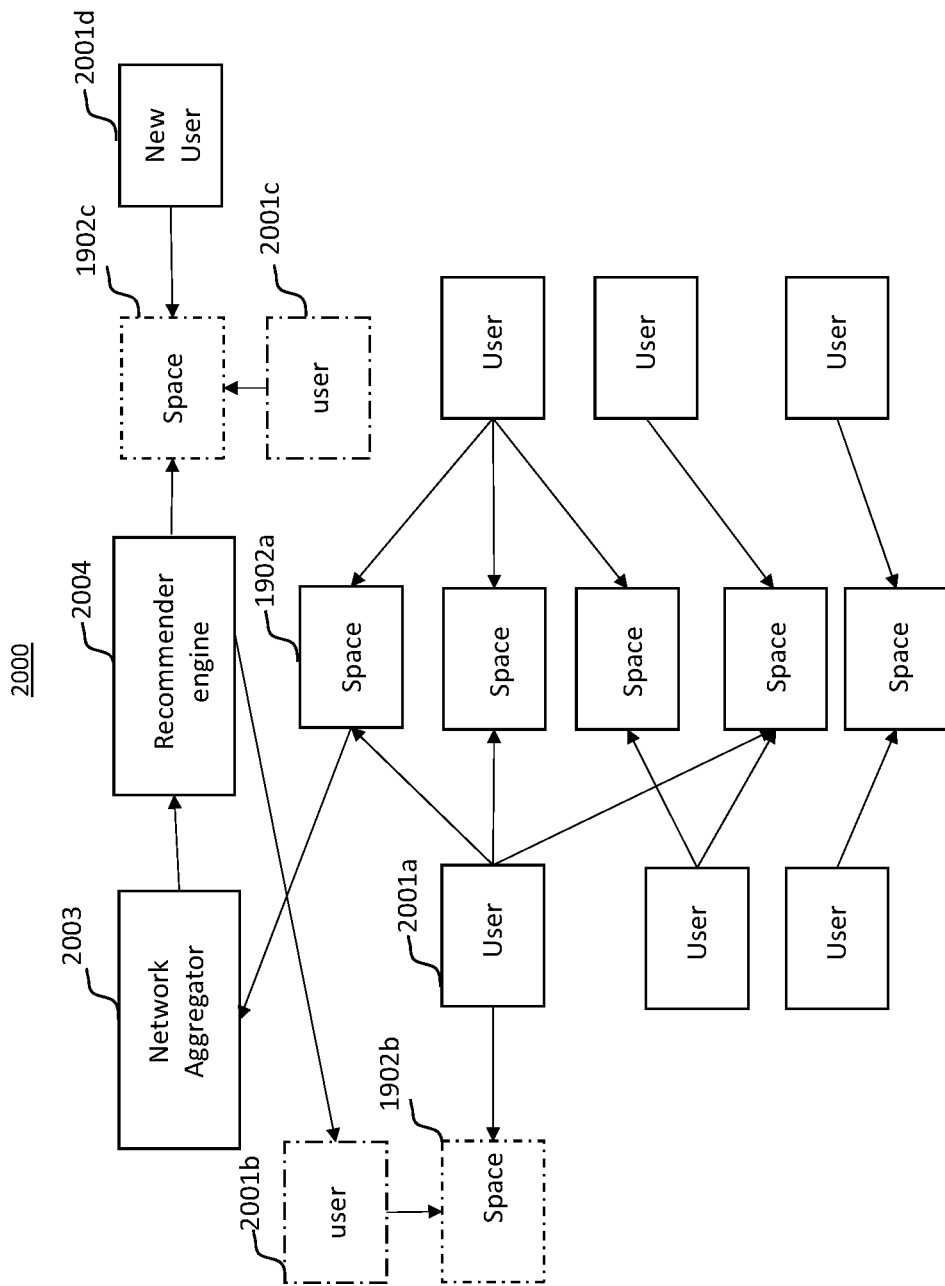
FIG. 20 shows an example of a block diagram illustrating a network aggregator and recommender system in accordance with an embodiment of the invention.

FIG. 20 shows a network aggregator and recommender system 2000 in accordance with an embodiment of the invention. System 2000 details how a functional contract-based network is constructed from the systems described in FIGS. 1-3. Users 2001*a*-2001*c* collaborate in spaces 1902*a*-1902*c* in order to negotiate and establish contracts which enable them to have working relationships which might involve delivering services or products. In some embodiments of the invention, the system contains a network aggregator 2003, which captures a user's services as well as information related to the user's negotiating style and rating across the user's space. In some embodiments of the invention, a user's negotiating style is determined by the speed at which they resolve compatibility issues and their likelihood that the other party will accept their terms. In some embodiments of the invention, the negotiating style is updated with each new negotiation and is calculated from the user's data. In some embodiments of the invention, a user's rating is established based on repeat collaborations and the total number of collaborations with independent users. In some embodiments of the invention, the rating is updated with each new negotiation and is calculated from the user's data. In some embodiments of the invention, the network aggregator 2003 converts the data and user relationships into triples and stores them in a knowledge graph recommender engine 2004.

When a new user 2001*d* joins the platform, existing users 2001*c* will be suggested as good partners to collaborate on contracts based on their services and ratings. In some embodiments of the invention, the recommender engine 2004 can also make suggestions to existing users 2001*b* based on the services they are seeking and their contract requirements. In some embodiments of the invention, users can also proactively ask the recommender engine 2004 for connection suggestions by searching through the knowledge graph of users.

Figure 21:
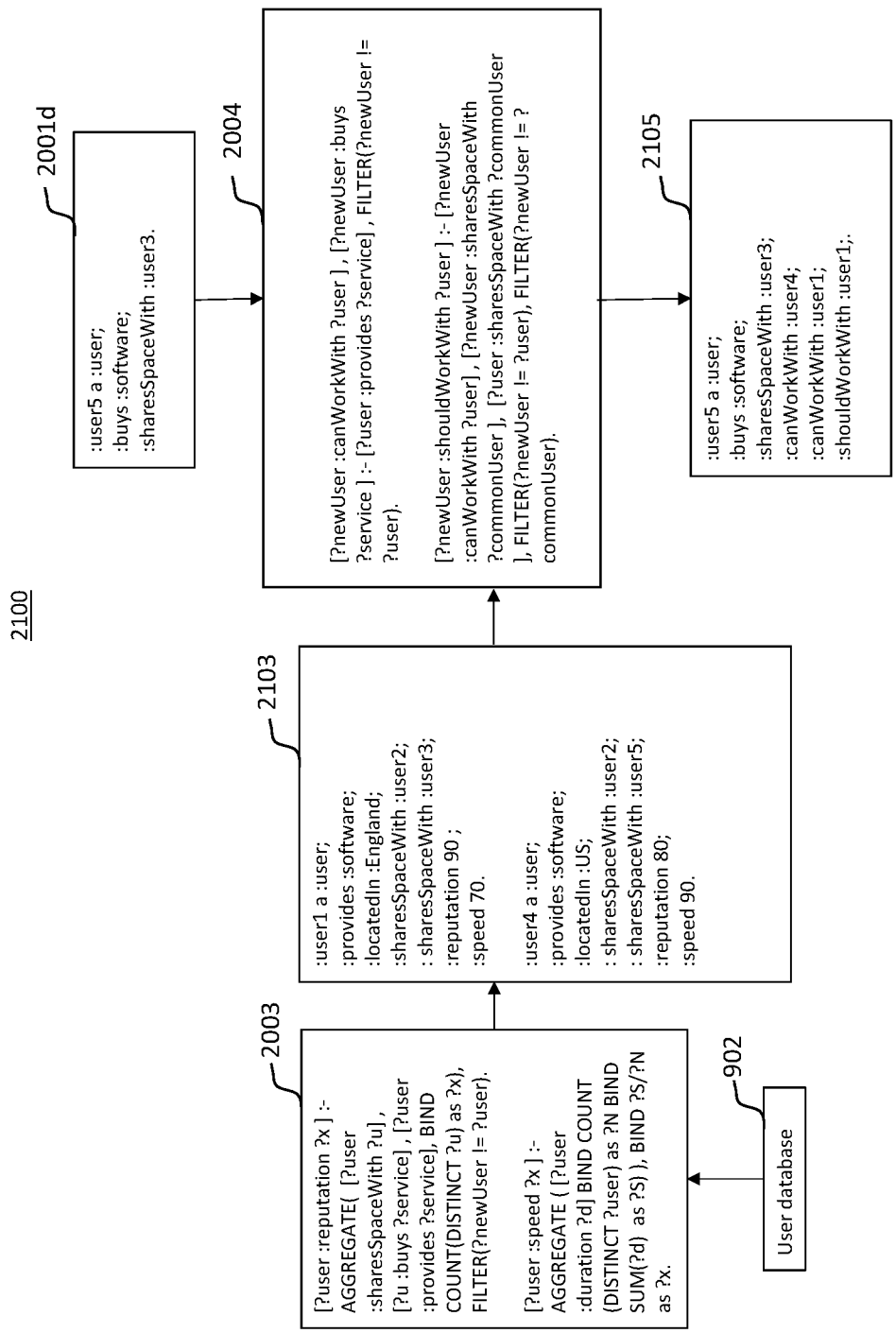
FIG. 21 shows an example of a block diagram illustrating a negotiation and services recommender system in accordance with an embodiment of the invention.

FIG. 21 shows implementation details of the negotiation and services recommender system 2100 in accordance with an embodiment of the invention. System 2100 provides more details to system blocks 2003 and 2004, illustrated on a simplified example of producing recommendations to a new user wishing to buy software from the network. The boxes associated with elements 2001*d*, 2003, and 2004 show portions of data structures and program code for implementing these elements, according to one embodiment of the invention. In some embodiments of the invention, the user database 902, which includes details on the spaces 1902*a* that users are involved with and of existing and historical contracts, is used by the network aggregator 2003 to produce a graph 2103 of users who provide the desired service. The aggregator 2003 applies rules to the graph 2103 to calculate, for each user, an average contract completion speed as well as a reputation score. In some embodiments of the invention, these scores are updated incrementally after each contract completion. The simple score shown in graph 2103 is the ratio of the number of contracts a user provides for a given service divided by the total number of agreements for that service. This score can be calculated differently to reflect other negotiation characteristics if required.

In some embodiments of the invention, once the user graph 2103 has been created, it is passed to the recommender engine 2004 which applies a new set of rules to establish recommendations 2105 for the new user 2001*d* wishing to purchase a service, which in this case is software. The rules establish, in an example embodiment, ":canWorkWith" edges between users who meet the initial criteria set by the new user. In this illustrative example, the criteria is that the users provide the software but this criteria could include geography, years of experience or reputation for example. The rules then establish a ":shouldWorkWith"

edge if the users already share spaces with common users. The output of this stage, in this example, is given in the user recommendation graph 2105.

In the example shown in FIG. 21, both the users from user graph 2103 can work with user 5 but user 1 should work with user 5 given their shared connection with user 3. User 5 can then choose which user to work with based on this information and can apply additional filters such as reputation or speed of completion to rank the recommendations. The rules to determine if users can or should work with each other can also be seamlessly changed and evolved in time based on user feedback and/or the quality of the recommendations.

A functional contract-based network built on a knowledge graph opens a number of opportunities which were simply not possible till now. Enabling users to find and offer services, negotiate and contract services and monitor their relationships over time is the most complete experience that can be offered to users searching or offering services. Until now, the negotiation and contracting were independent steps which happened offline or with a third party which in turn created more friction, costs and made the monitoring of the relationships harder. As a result, the contract-based knowledge graph network could enable the next generation of marketplace platforms including but not limited to property, education, recruitment, and finance. The contract-based knowledge graph networks also enable users to consider new metrics in their decision-making process which were previously unavailable to them such as the negotiation style and user ratings as well as information on the market guidelines for acceptable terms. The knowledge graph management of the users and services also allows users to use concepts which aren't defined in the contracts or the services. For example, a user can search for concepts such as "simple" contracts or "good value" services as long as these concepts can be modelled as rules which helps improve the quality of the experience and results.

A functional contract-based network as described in system 2000 and 2100 would not be possible without the invention of the knowledge graph approach for accurately modelling contract terms in graphs and automating contract negotiation with symbolic reasoning as described in systems and methods 300, 600, 700, 900, 1000, 1100, 1200 and 1700. Automating contract negotiation required a paradigm shift in terms of how contracts are typically negotiated by shifting the focus to the contract concept level as opposed to the drafted agreement which is where all the existing solutions focus. In order to model the concepts which, govern the structure and compatibility of a contract for any contract type, a novel technique was developed to facilitate the conversion of the contract templates to concepts expressed as triples and rules as described in system 700. The process of creating new contracts with new user provided terms involved converting the terms to triples and applying the extracted rules from the first step.

In doing so, the rules will materialise a negotiated and compliant contract in the knowledge graph. The benefit of using symbolic rules to generate the contract is that they output facts as opposed to estimates like with machine learning which has also been a reason why previous solutions have only solved part of the issue. This means that the outcomes do not need to be verified by a legal team if they are aligned with the original rules because the outcomes only exist when the rules' conditions are satisfied. When "non-compatible" nodes are materialised in the graph, the same symbolic rules can determine compatible alternatives. Historical usage data can then inform estimates of the likelihood of these alternatives being accepted by the other party which can help guide the negotiation. This support can be beneficial for less experienced legal teams as they can now access information on industry practices which they wouldn't have necessarily had access to without a deep knowledge of the market and players.

This approach reduces the contract parties' dependency on legal teams for negotiating the contract by autonomously handling the compatibility detection and remediation without jeopardizing the quality of the contract unlike existing solutions which all require legal supervision and intervention. This helps significantly reduce the time required to negotiate a contract and provides a more complete service to users would not have access to a large legal team. Moreover, negotiating at the level of terms and contract concepts is less prone to conflict and distraction than at draft level, which might lead to reformulations of the same concepts to satisfy legal team wording preferences.

Modelling negotiated contracts as knowledge graphs has also opened the door to a new way of storing contracts which until now were stored as pdfs or word documents. Knowledge graphs "know" what their objects contain and how they interrelate with each other which has helped unlock efficiency and intelligence for contract management. Effectively, contract knowledge graphs are aware of their lifecycle and related events as well as when they conflict with each other. They are also aware of external laws and how to adapt if policy changes are introduced. They are also aware of mergers and acquisitions and can determine which contracts require permission from the other party to be assigned because the information is stored in the negotiated contract graphs. They are also able to extract aggregate statistics 317 which would otherwise be difficult to access from pdfs. The knowledge graphs are also easier to search since users can search for specific concepts which aren't necessarily recorded in the original contract data. For example, a user can search for "simple" contracts or any other concept as long as it can be defined in the rule engine. This has enabled the contract and user aggregation described in system 2000 which in turn has enabled the development of a knowledge-based recommender engine capable of facilitating contract creation by matching users based on their service or product requirements and contract negotiation style as described in system 2100. This helps users find better services and products but more importantly incentives users to adopt a positive contract negotiation behaviour regardless of their size and legal budget in order to build and uphold their reputation in the network. This is the first time a network or marketplace has been able to factor in the parties' negotiation style and effectiveness in the matching process because existing networks simply do not support contract negotiation and negotiation tied user metrics.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A document generation system comprising:
at least one memory configured to a store a program; and
at least one processor communicatively connected to the at least one memory and configured to execute the stored program to:
receive an indication of a type of a document to be generated, the type of the document defining a plurality of rules governing terms of the document;
receive a plurality of terms from a plurality of sources including at least a first set of terms of the document from a first source and a second set of terms of the document from a second source, wherein the first source is different from the second source;
convert the first set of terms into a first plurality of triples;
convert the second set of terms into a second plurality of triples;
apply the plurality of rules governing the terms of the document to the first plurality of triples and the second plurality of triples to generate a knowledge graph and determine whether the first set of terms is compatible with the second set of terms, wherein the first set of terms is determined to be compatible with the second set of terms in a case where the plurality of rules governing terms of the document is satisfied;
generate a reconciled knowledge graph by, in a case where at least one or more first terms of the first set of terms is non-compatible with one or more second terms of the second set of terms, reconciling at least one of the one or more first terms or the one or more second terms that are non-compatible in the generated knowledge graph until the first set of terms is compatible with the second set of terms; and
generate the document based at least on the reconciled knowledge graph.

2. The system according to claim 1, wherein the plurality of rules governing the terms of the document are automatically extracted from a knowledge graph template associated with the type of the document to be generated.

3. The system according to claim 1, wherein, in the case where at least one or more first terms of the first set of terms is non-compatible with the one or more second terms of the second set of terms, the at least one processor is further configured to execute the stored program to:
receive historical data pertaining to compatible values for the at least one or more first terms non-compatible with the one or more second terms;
propose a change to at least one of the non-compatible one or more first terms or one or more second terms based on the received historical data;
in a case where the proposed change is to the one or more first terms, transmit the proposed change to the one or more first terms to the first source and receive updated values for the one or more first terms from the first source; and
in a case where the proposed change is to the one or more second terms, transmit the proposed change to the one or more second terms to the second source and receive updated values for the one or more second terms from the second source.

4. The system according to claim 3, wherein the historical data includes one or more of a collection of past documents, legal rules representing domain knowledge, or information associated with a jurisdiction of the first source or the second source.

5. The system according to claim 1, further including at least one data store configured to store a plurality of types of documents and an associated plurality of terms for each type of document of the plurality of types of documents,
wherein the at least one processor is further configured to execute the stored program to receive, as the plurality of terms, the associated plurality of terms for the indicated type of the document from the at least one data store.

6. The system according to claim 5, wherein the at least one data store is further configured to store an associated plurality of rules for each type of document of the plurality of types of documents, and
wherein the at least one processor is further configured to execute the stored program to validate the received plurality of terms by applying the associated plurality of rules for the indicated type of the document.

7. The system according to claim 1, wherein the at least one processor is further configured to execute the stored program to:
receive historical data pertaining to standardized values for compatible first terms and second terms;
compare the values of the compatible first terms and second terms with the standardized values in the historical data; and
provide an alert in a case where the values of the compatible first terms and second terms deviate from the standardized values in the historical data.

8. The system according to claim 1,
wherein the terms of the document include negotiable terms and non-negotiable terms, and
wherein the knowledge graph is generated using one or more first triples of the first plurality of triples corresponding to the negotiable terms and one or more second triples of the second plurality of triples corresponding to the negotiable terms.

9. The system according to claim 1,
wherein the knowledge graph includes a first sub-graph representing the first set of terms from the first source and a second sub-graph representing the second set of terms from the second source, and
wherein the at least one processor is further configured to execute the stored program to:
apply the plurality of rules governing the terms of the document to the first sub-graph and the second sub-graph;
identify corresponding terms of the first sub-graph and the second sub-graph where equivalent values are provided as compatible; and
identify corresponding terms of the first sub-graph and the second sub-graph where non-equivalent values are provided as non-compatible.

10. The system according to claim 1,
wherein the plurality of rules includes one or more first rules that determine whether the first set of terms is compatible with the second set of terms and one or more second rules that reconcile at least one of the one or more first terms or the one or more second terms that are non-compatible, and
wherein the at least one processor is further configured to execute the stored program to:
apply the one or more first rules to the generated knowledge graph before applying the one or more second rules to the generated knowledge graph.

11. The system according to claim 1, wherein the plurality of sources includes one or more of a user, a commercial entity, or a program configured to provide the terms of the document.

12. A method of generating a document, the method executable by a programmed processor, the method comprising:
receiving an indication of a type of a document to be generated, the type of the document defining a plurality of rules governing terms of the document;
receiving a plurality of terms from a plurality of sources including at least a first set of terms of the document from a first source and a second set of terms of the document from a second source, wherein the first source is different from the second source;
converting the first set of terms into a first plurality of triples;
converting the second set of terms into a second plurality of triples;
applying the plurality of rules governing the terms of the document to the first plurality of triples and the second plurality of triples to generate a knowledge graph and determining whether the first set of terms is compatible with the second set of terms, wherein the first set of terms is determined to be compatible with the second set of terms in a case where the plurality of rules governing terms of the document is satisfied;
generating a reconciled knowledge graph by, in a case where at least one or more first terms of the first set of terms is non-compatible with one or more second terms of the second set of terms, reconciling at least one of the one or more first terms or the one or more second terms in the generated knowledge graph that are non-compatible until the first set of terms is compatible with the second set of terms; and
generating the document based at least on the reconciled knowledge graph.

13. A non-transitory computer readable storage medium configured to store a program that causes a programmed processor to generate a document, the method comprising:
receiving an indication of a type of a document to be generated, the type of the document defining a plurality of rules governing terms of the document;
receiving a plurality of terms from a plurality of sources including at least a first set of terms of the document from a first source and a second set of terms of the document from a second source, wherein the first source is different from the second source;
converting the first set of terms into a first plurality of triples;
converting the second set of terms into a second plurality of triples;
applying the plurality of rules governing the terms of the document to the first plurality of triples and the second plurality of triples to generate a knowledge graph and determining whether the first set of terms is compatible with the second set of terms, wherein the first set of terms is determined to be compatible with the second set of terms in a case where the plurality of rules governing terms of the document is satisfied;
generating a reconciled knowledge graph by, in a case where at least one or more first terms of the first set of terms is non-compatible with one or more second terms of the second set of terms, reconciling at least one of the one or more first terms or the one or more second terms in the generated knowledge graph that are non-compatible until the first set of terms is compatible with the second set of terms; and
generating the document based at least on the reconciled knowledge graph.

\* \* \* \* \*